United States Patent [19]
Eick

[11] Patent Number: 5,742,777
[45] Date of Patent: Apr. 21, 1998

[54] APPARATUS FOR SELECTIVE SIMULTANEOUS DISPLAY OF INFORMATION ABOUT PLURALITY OF ENTITIES

[75] Inventor: Stephen G Eick, Naperville, Ill.

[73] Assignee: Lucent Technologies Inc., Murray Hill, N.J.

[21] Appl. No.: 296,612

[22] Filed: Aug. 26, 1994

Related U.S. Application Data

[63] Continuation of Ser. No. 802,912, Dec. 6, 1991, abandoned.
[51] Int. Cl.$^6$ .................................................. G06F 17/27
[52] U.S. Cl. ................................................. 395/326
[58] Field of Search ........................... 395/130, 131, 395/144, 145, 147, 153, 155, 160, 161, 326, 333–335, 338–342, 352–353, 965–967; 345/150; 434/273, 367

[56] References Cited

U.S. PATENT DOCUMENTS

| | | | |
|---|---|---|---|
| 4,809,170 | 2/1989 | Leblang et al. | 395/703 |
| 4,843,599 | 6/1989 | Bucker | 345/150 X |
| 4,845,653 | 7/1989 | Conrad et al. | 395/357 X |
| 4,847,785 | 7/1989 | Stephens | 395/131 X |
| 4,937,743 | 6/1990 | Rassman et al. | 395/141 X |
| 4,958,301 | 9/1990 | Kobayashi | 395/131 |
| 5,136,690 | 8/1992 | Becker et al. | 395/349 |
| 5,146,557 | 9/1992 | Yamrom et al. | 395/339 |
| 5,150,458 | 9/1992 | Masuzaki et al. | 395/131 X |
| 5,179,650 | 1/1993 | Fukui et al. | 395/782 |
| 5,191,646 | 3/1993 | Naito et al. | 395/349 |
| 5,196,838 | 3/1993 | Meier et al. | 345/118 |
| 5,212,771 | 5/1993 | Gane et al. | 395/357 |
| 5,270,919 | 12/1993 | Blake et al. | 340/827 |
| 5,295,242 | 3/1994 | Mashruwala et al. | 395/356 |
| 5,339,390 | 8/1994 | Robertson et al. | 395/342 |
| 5,339,391 | 8/1994 | Wroblewski et al. | 395/342 |
| 5,341,466 | 8/1994 | Perlin et al. | 395/139 |
| 5,410,648 | 4/1995 | Pazel | 395/704 |

FOREIGN PATENT DOCUMENTS

A-2137788  10/1984  United Kingdom ............ G09G 3/36

OTHER PUBLICATIONS

"Learning Data Analysis with Data Desk", by P.F. Velleman, Working with Displays, pp. 101–114, 1989.
"Data Desk, The New Power of Statistical Vision", P.F. Velleman, Quickstart Guide, pp. 1–42, 1992.
Borland, Quattro Pro 2.0 User's Guide, pp. 338–343, 349–350, 380–381, 1990.
Rau et al., Visualization and Man–Machine Interaction in Clinical Monitoring Tasks, Visualization in Biomedical Computing, pp. 268–272, 1990.
Herot et al., A Prototype Spatial Data Management System, ACM SIGGRAPH 80, Jul. 1980, pp. 63–70.
Tufte, The Visual Display of Quantitative Information, 1983, pp. 155, 139, 166–169, 1983.
Tufte, Envisioning Information, 1990, pp. 67–68, 80–81, 88.
Borland, Quattro Pro Version 2.0 User Guide, 1990, pp. 193–195, 262–263.
Microsoft, Windows 3.0 User Manual, 1990, pp. 17–22, 41–55, 118–119, 148–153, 221–257, 399–403.

(List continued on next page.)

*Primary Examiner*—Anton W. Fetting

[57] ABSTRACT

Techniques for displaying an intermediate level of detail in a computer system. The techniques are employed in a system for discovering information about a large body of software. The system displays representations of up to 40,000 lines of code in a single window. Included in the techniques for displaying the intermediate level of detail are the use of color and shape to indicate characteristics of lines, the linking of all of the lines which share a certain characteristic, and selection at the levels of the line, the characteristic, and the file. The software information system further includes one or more code viewers for simultaneously displaying selected lines of code. A cursor may be attached to or detached from a single one of the code viewers.

50 Claims, 9 Drawing Sheets

OTHER PUBLICATIONS

Exploring the Unix System by Kochan & Wood; 1984 pp. 231–233 (The Make Program).

T. W. Ringle and M. S. Van Dyke, "Multi–Page Document Display", *IBM Technical Disclosure Bulletin*, vol. 23, No. 8, Jan. 1981, pp. 3794–3795.

M. Saito, W. Bender, "A Color–Based Text Editor", 1985 *SID International Symposium, Digest of Technical Papers*, vol. 16, 30 Apr. 1985, pp. 24–27.

A. Lippman, W. Bender, G. Solomon, M. Saito, "Color Word Processing", *IEEE Computer Graphics and Applications*, vol. 5, No. 6, Jun. 1985, pp. 41–46.

MR OBJECT 901

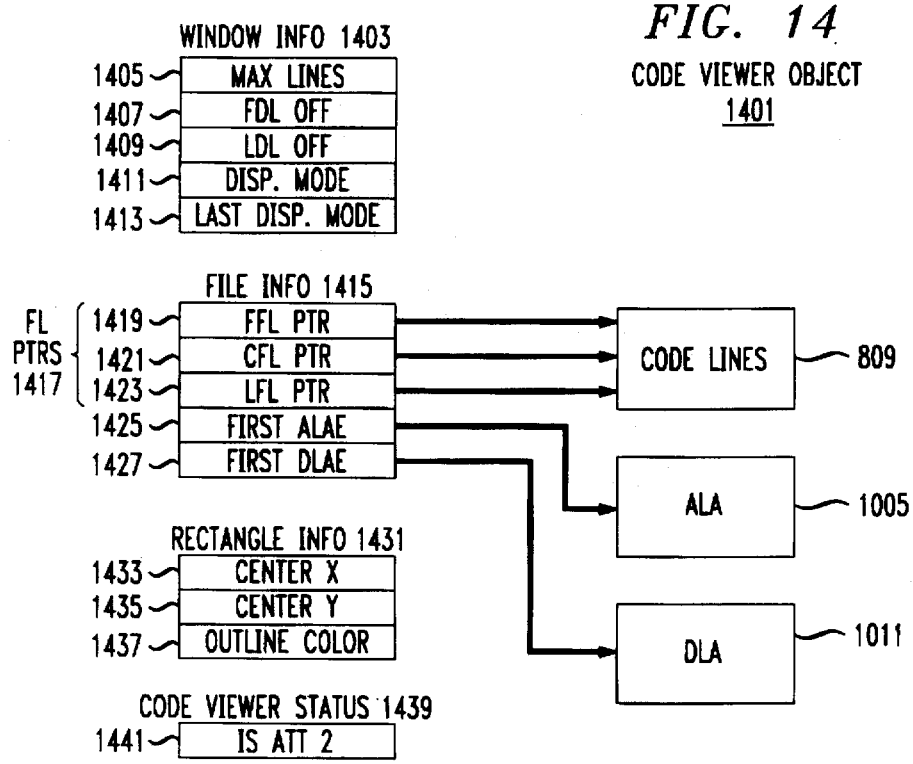
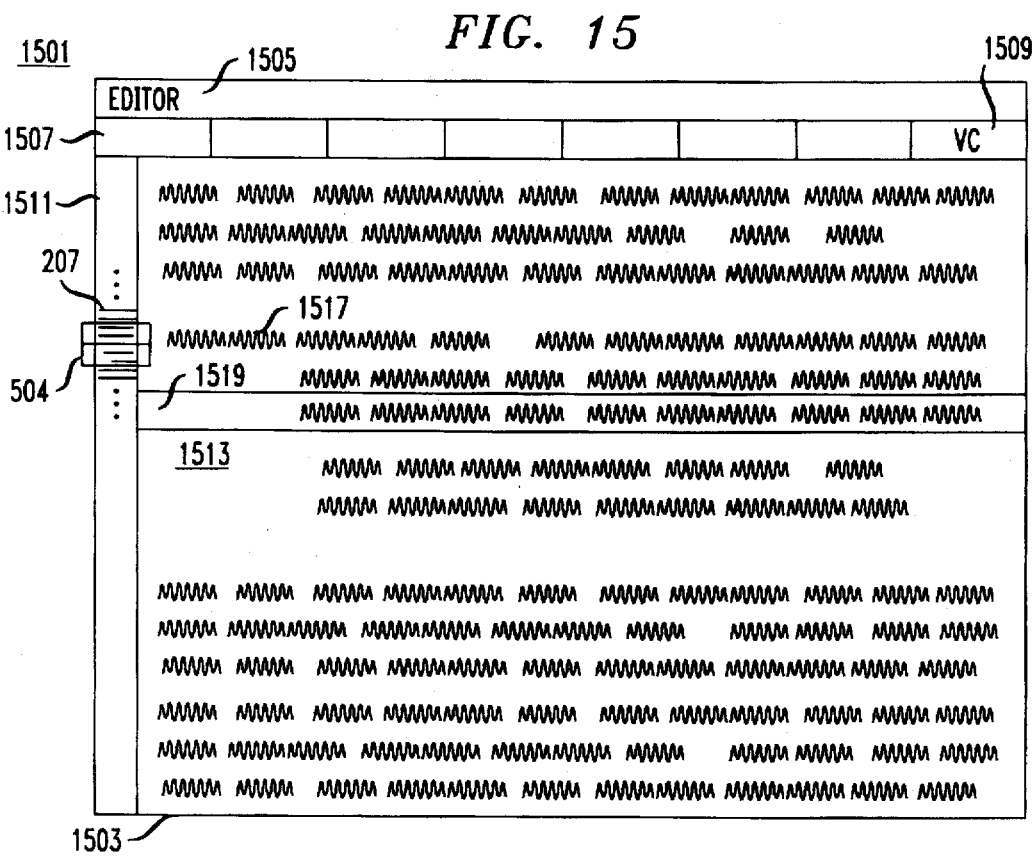

APPARATUS FOR SELECTIVE SIMULTANEOUS DISPLAY OF INFORMATION ABOUT PLURALITY OF ENTITIES

This application is a continuation of application Ser. No. 07/802,912, filed on Dec. 6, 1991, now abandoned.

BACKGROUND OF THE INVENTION

1. Field of the Invention

The invention concerns the display of information in a digital computer system and more particularly concerns the display of information about a very large number of entities.

2. Description of the Prior Art

A major problem for users of computer systems is that displays of information accessible through the computer system generally provide either a very high level view of the information or a very detailed view of the information, while the user often needs a view of the information which is at an intermediate level. For example, text files are represented in their entirety by icons or file names, and once a text file has been selected, a number of lines in the file can be displayed in a window. There is, however, no display of information which gives a reasonable idea of how the lines presently displayed in the window relate to the lines in the entire file. One consequence of the lack of such an intermediate level of display information is that it becomes difficult to use and understand available information. For instance, many programming projects maintain a change data base which contains information about the changes made on the source code of a computer program. It is possible to determine from the data base when each line of the source code was changed, but the prior art has provided no way of giving the programmer an overview of the relationship between the changes and the files containing the source code. Answering a question such as what other lines of source code were changed when a given line was changed becomes very laborious, and even when the question is answered, it is answered in such a way that the programmer often cannot appreciate the significance of the answer.

One attempt to provide a low level of intermediate level of information has been the scroll bar. Many text editors provide a scroll bar at one side or the other of the window in which the text being edited appears. The scroll bar represents the entire text, and by positioning the cursor in the scroll bar, one can move to a corresponding point in the text. For example, if one moves the cursor to a point ½ way down the scroll bar, the text which appears in the window is centered on the line which is half way through the document. In some scroll bars, there is further a change in appearance of the part of the scroll bar which corresponds to the portion of the document currently being displayed in the window, so that the user can, by looking at the scroll bar, determine where the displayed portion is relative to the entire text.

The scroll bar has further been used to provide a somewhat more detailed level of some kinds of intermediate information. William C. Hill, James D. Hollan, Dave Wroblewski, and Tim McCandless disclose a system in their article "Edit Wear and Read Wear: Their Theory and Generalizations", *Software Production Research*, in which the scroll bar includes histograms showing how often individual lines of a document have been edited or read. The addition of histogram information to the scroll bar is a specific example of a general technique termed attribute mapped scroll bars which is disclosed in two U.S. patent applications: Wroblewski, Hill, McCandless, *Attribute-enhanced Scroll Bars*, U.S. Ser. No. 07/523,117, filed May 14, 1990, and U.S. Ser. No. 07/626,130, filed Dec. 11, 1990. While useful, attribute mapped scroll bars provide an intermediate level of information only if the information is present. They do not solve the general problem of showing intermediate structures such as text lines or data records which are always present in the files or data bases being displayed. It is an object of the apparatus and techniques disclosed in the following to solve this and other problems of information display in computer systems.

SUMMARY OF THE INVENTION

In one aspect, the invention is apparatus for visibly displaying information about a class of subentities of an entity. The apparatus includes:

entity representation means for visibly representing the entity in the display;

subentity representation means for visibly representing each of the subentities in the entity representation means, one of the subentity representation means corresponding to each of the subentities and the smallest dimension in pixels of each of the subentity representation means being substantially smaller than the height in pixels of the smallest distinguishable representation of the letter "e" which may be displayed in the display;

selection means for selecting any of the subentity representation means from the display; and information display means responsive to the selection means for displaying information about the subentity selected by the selection means.

Another aspect of the invention is apparatus for visually representing characteristics of the contents of a set of files in a display. The apparatus comprises:

means for associating a visual characteristic with a given characteristic of the content; and file representation means for visually representing files in the set thereof in the display, each file representation means corresponding to an individual file and showing the visual characteristic if the file corresponding to the file representation means has the given characteristic of the content.

In yet another aspect, the invention includes apparatus for displaying detailed information about an entity represented by an entity representation in a display including a movable cursor. The apparatus comprises:

one or more entity representation specifiers for specifying an entity representation representing the entity which the detailed information concerns;

a detailed information display means corresponding to each of the entity representation specifiers for displaying the detailed information concerning the entity represented by the entity representation specified by the corresponding entity representation specifier; and attachment means for attaching a single one of the entity representation specifiers to the movable cursor so that the single entity representation specifier attached to the movable cursor moves with the cursor.

The foregoing and other aspects and objects of the techniques and apparatus disclosed herein will be apparent to those of ordinary skill in the art after perusal of the following Drawing and Detailed Description, wherein:

BRIEF DESCRIPTION OF THE DRAWING

FIG. 14 is a diagram of a code viewer object; and

FIG. 15 is a display for a text editor incorporating the techniques of the preferred embodiment.

Figure 1:
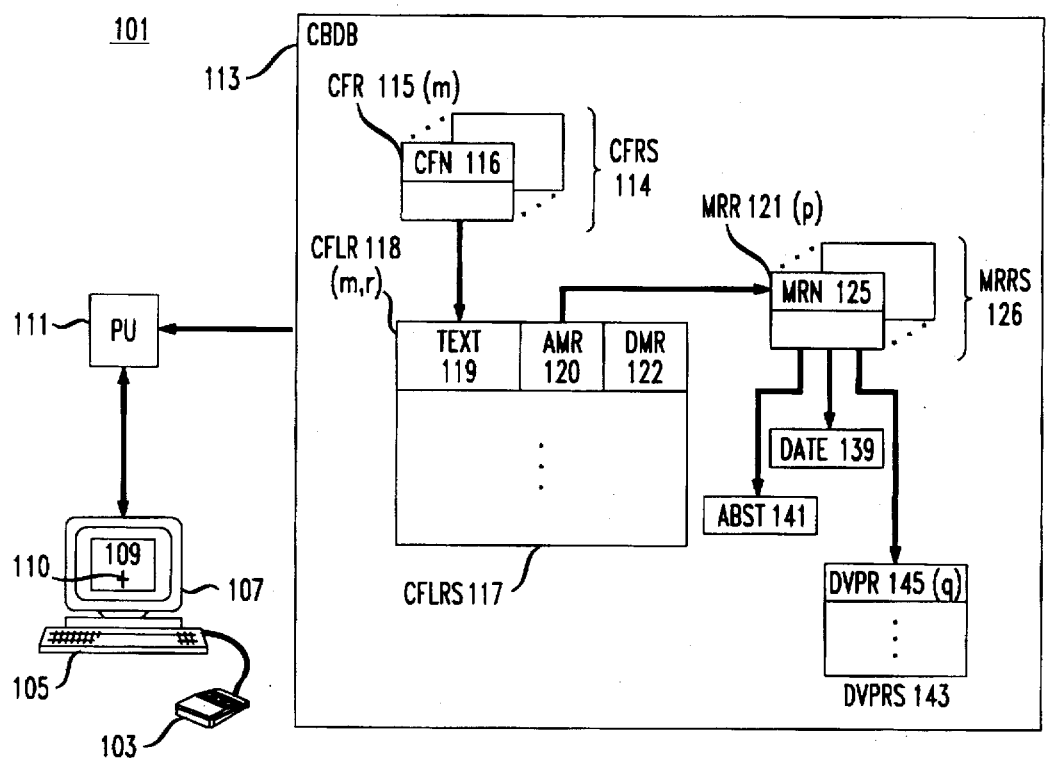
FIG. 1 is a diagram of a system in which a preferred embodiment is employed.

Reference numbers employed in the Drawing and the Detailed Description have two parts. The two least significant digits specify the number of an item in a figure; the remaining digits specify the figure in which the item first appears; thus, an item with the reference number 603 is first shown in FIG. 6. Where a reference number represents many identical items, a given one of the items is specified by means of a subscript on the reference number; thus, 115(m) specifies the mth one of the items indicated by the reference number 115.

DETAILED DESCRIPTION

The following Detailed Description of a preferred embodiment will first describe an environment in which the preferred embodiment is employed, will then describe how the preferred embodiment appears to its users and how the preferred embodiment is implemented, and will finally describe other embodiments and applications of the invention.

Environment of the Invention: FIG. 1

A preferred embodiment of the invention is employed by developers in charge of maintaining a very large body of code for a digital switch. A major problem in maintaining any large body of code is keeping track of the changes. The developers who use the preferred embodiment make changes in the code for the digital switch only in response to modification requests, or MRs. In environment 101 in which the preferred embodiment is employed, all of the changes resulting from the MRs are recorded in code body data base 113. In data base 113, there is a code file record (CFR) 115 for each file of code used in the switch. Together, these records 115 make up code file records (CFRS) 114. A given code file record 115(m) includes code file name (CFN) 116, which is the name of the code file to which the record corresponds, and a pointer to a set of code file line records 117. Set of records 117 includes a code file line record (CFLR) 118 for every line of code which has been added to or deleted from the code file corresponding to code file record 115(m). A code file line record 118(m,r) for line r of the file represented by code file record 115(m) contains three fields:

Text field 119 contains the text of the added or deleted line;

Add MR (AMR) 120 and delete MR (DMR) 122 are pointers to records in code body data base 113 for the MRs which resulted in the addition of the line to or deletion of the line from the file. Since every line was at one time added to the body of code, every line has a pointer in AMR field 120; if the line was subsequently deleted, there is also a pointer in DMR field 122; otherwise, DMR field 122 has a null pointer value.

In CFLR 118(m,r), add MR field 120 contains a pointer and DMR field 122 contains a null value. Hence, there is a single modification request record (MRR) 121 corresponding to the code file line represented by code file line record 118(m,r).

There is a modification request record 121 for every modification request which has resulted in a change in the body of code. All of the modification request records 121 together make up modification request records (MRRS) 126. Each modification request record 121 contains modification request name (MRN) 125 and pointers to other items of information. Those relevant to the present discussion include date 139, which is the date at which the modifications requested in the modification request were completed, abstract 141, which is a short description of the modification request, and developer records (DVPRS) 143 which contains developer records (DVPR) 145 for the developers who carried out the modification request.

As is apparent from FIG. 1, every code file line record 118 which was modified by a given modification request will contain a pointer to the modification request record 121 for the given modification request. A developer may thus employ code body data base 113 to determine when, why, and by whom every line in the body of code was added or deleted. All of the information in code body data base 113 is accessible by means of processing unit 111, which can use a data base system to retrieve information from code body data base 113. The retrieved information can be displayed on display 107 in response to commands input via keyboard 105 or pointing device (in this case, a mouse) 103. A current position in display 107 is indicated by cursor 110, which may be controlled either from keyboard 105 or mouse 103. If a windowing system is executing on processor 111, the information may be displayed in one or more windows 109 in display 107. For example, a programmer might employ one window 109 to display lines of code from the text fields 119 of the code file line records 118 for the relevant lines and another window to display information from modification request records 121 for the relevant lines.

While code body data base 113 contains all of the information which a programmer seeking to understand the history of the body of code needs, the usefulness of the information is severely limited by the fact that very little of it is visible at a given moment. Display device 107 has a display which generally measures no more than 19 inches diagonally, and information from code body data base 113 is generally displayed in the form of ASCII characters; consequently, no more than about 200 total lines of information from code body data base 113 can be usably displayed in display device 107.

Using the Preferred Embodiment to Display Information: FIGS. 2–6

Figure 2:
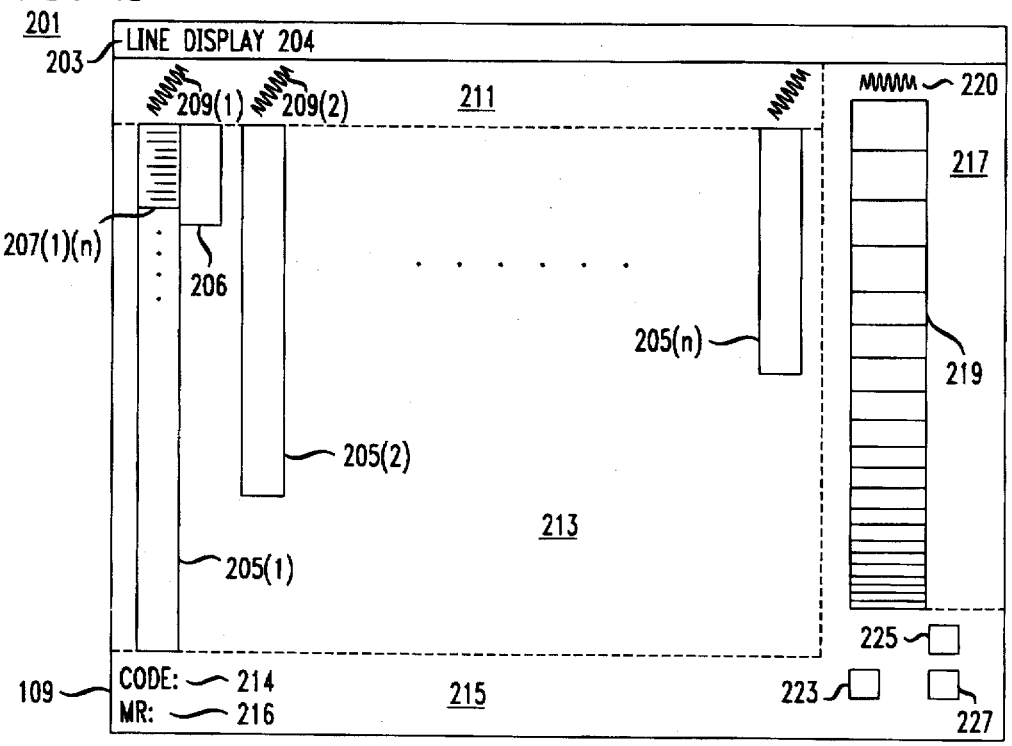
FIG. 2 is a diagram of a display produced by the preferred embodiment.

FIG. 2 shows how the preferred embodiment is employed to display information from code body data base 113.

Display 201 is in a window 109 of display 107. As indicated by title 203 at the top of display 201, the display's purpose is to display information about lines of code from the code files making up the body of code. Display 201 is divided into five parts:

Title display part 204 displays the window's title;

display space part 213 displays file columns 205 which represent code files 116 and which contain line representations 207 representing lines in the code file 116 represented by the file column 205;

top space part 211 contains the name of the code file represented by each file column 205;

right hand space part 217 displays line characterization column 219; and bottom space part 215 displays textual information about a selected line of code or a selected modification request and three buttons for controlling the preferred embodiment.

Beginning with details of display space 213, there is a column 205 for each code file in the body of code. The name 209 of the code file to which column 205 corresponds appears in top space 211 above that column 205. The name is of course taken from code file name 116 of code file record 115 corresponding to the code file. Each column 205 is automatically sized so that columns 205 for all of the code files in the body of code fit in display space 213. The minimum width of a column is 15 pixels, and the column is as long as is required to contain a line representation 207 for each code line for which a line representation is being displayed. If the number of lines in the code file results in a column 205 which is longer than display space 213, an additional column 206 for the remaining lines is placed immediately adjacent to column 205.

The developer can employ button 227 to select code lines for display. In the preferred embodiment there are three options:

a lines added option, in which the line representations 207 in the columns 206 represent code lines which have been added to the files represented by columns 206 and have not been deleted;

a lines deleted option, in which the line representations 207 in the columns 206 represent code lines which have been deleted from the files represented by columns 206; and a split column option, in which two sets of line representations are displayed side by side in the columns 206, one representing code lines which have deleted and the other representing code lines which have been added.

Whether a code line has been added or deleted can of course be determined from code body data base 113. The line representations 207 appear in the same order in column 205 as the lines appear in the code file. In the preferred embodiment, line representations 207 are a single pixel thick. As will be discussed in more detail below, the color of line representations 207 can be changed by operations on display 201.

In the preferred embodiment, the code is written using standard indentation rules, and consequently, indentations of code lines carry information about the structure of the code. To make this information available to programmers looking at display 201, the preferred embodiment provides a button 223 which selects whether a line representation 207 is to show the indentation of the corresponding code line. The programmer uses his mouse 103 to activate the button and thereby select indentation. If indentation has been selected, the pixels of line representation 207 begin at a distance from the right-hand side of column 205 which corresponds to the degree of indentation of the corresponding code line and the line representation contains a number of pixels which corresponds to the length of the corresponding code line. If indentation has not been selected, line representation 207 fills the entire width of column 205.

Bottom space 215 contains buttons 223, 225, and 227 and labels 214 and 216; the use of button 223 and button 227 have already been discussed, and the use of button 225 will be described in detail later. Label 214 indicates the where the preferred embodiment displays the text of a selected line of code and label 216 indicates the position at which the text of the abstract of a selected modification request is displayed. The manner in which the selection occurs will be described later.

Right hand space 217 contains line characterization column 219 and line characterization column label 220. Line characterization column 219 indicates how different values from modification request records 121 are to be displayed in line representations 207. For example, each code file line record 119 includes a pointer to the modification request record 121 for the modification request which added or deleted the line, and the relevant modification request record 121 in turn includes a pointer to date record 139; consequently, the time at which every line of code was added to or deleted from the code body can be determined from code body data base 113. The time at which a line of code was changed is made visible in display 201 as follows: a shade of color is assigned to each modification request. The shade depends on when the modification request was completed. In the preferred embodiment, the shades range from red through yellow to blue, with blue representing the oldest and red the most recent modification request. Further, each modification request is associated with a modification request representation consisting of a rectangle of pixels in line characterization column 219, with the rectangle for the oldest modification request at the bottom and the rectangle for the youngest at the top. The modification request representation for a given modification request is further displayed in that modification request's color, so that the color of line characterization column 219 ranges from blue at the bottom to red at the top. Finally, the line representations 207 which were added or deleted in a given modification request are displayed in the color corresponding to that time. Thus, line representations 207 which were added or deleted in the most recent modification request are red, while those which were added or deleted in the oldest modification request are blue, and the other line representations 207 have the colors corresponding to the modification requests in which they were added or deleted.

Display 201 is thus noteworthy for two reasons: first, it displays representations 207 of all of the lines in the code body at once. Second, it displays information about the displayed lines. As regards the display of representations of all of the lines in the code body, a standard display 107 with a 19 inch diagonal measurement can display 1024 pixels vertically and 1280 pixels horizontally. If display 201 is in a window 109 which occupies substantially all of display 107, line characterization column 219 takes up about one fifth of the horizontal space and top space 211 and bottom space 215 about one eighth of the vertical space, leaving a display space 213 of about 900 pixels by 1000 pixels for display of columns 205. With a minimum column width of 15 pixels and a distance of 8 pixels between columns, more than 40 columns 205 can be displayed, and each of these columns can have up to 900 line representations. Thus, a single display space 213 in a preferred embodiment can display line representations 207 for more than 36,000 individual lines of code.

As regards the display of information about the lines, in the example set forth above, display 201 provides the developer with a complete overview of the temporal development of the code body. Line representations 207 which have the same or closely-related shades represent code lines which were modified at approximately the same time. The developer can thus see the major stages of development of the code body from the colors which appear in the line representations 207 in the columns 205. Further, the developer can determine whether a portion of the body of code has remained stable over time or whether it has been constantly reworked. In the first case, most of the line representations 207 will have the same color; in the second, they will have many different colors. Finally, the developer can easily see how changes made in one code file relate to changes made in other code files, and can thereby see dependencies between code files.

Figure 3:
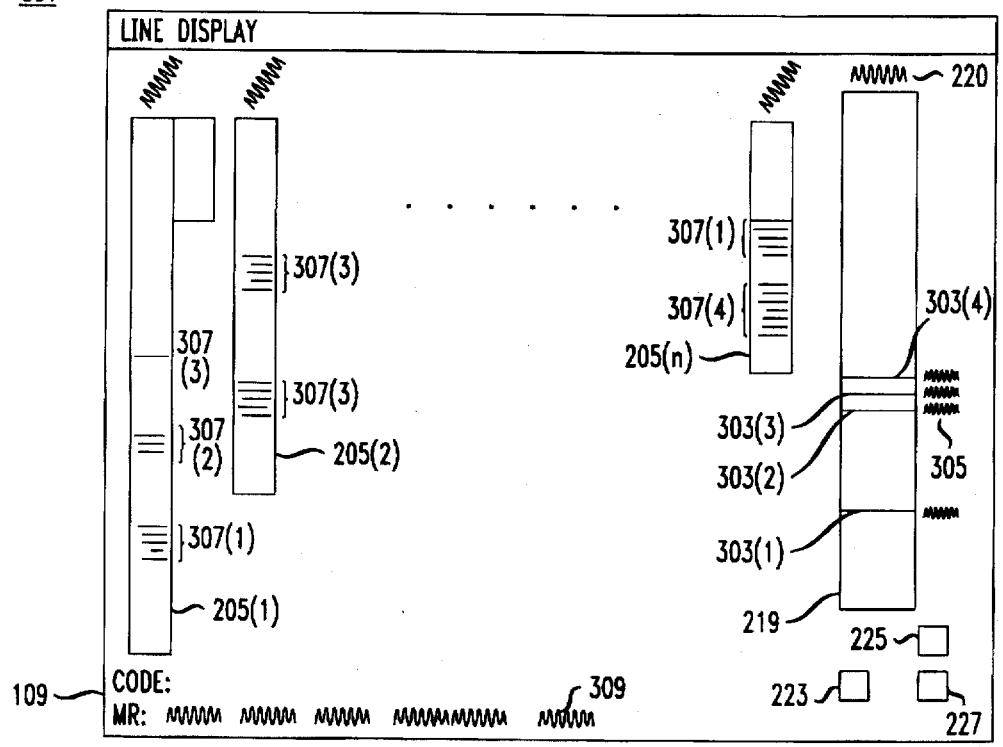
FIG. 3 is a diagram of a second display produced by the preferred embodiment.
Figure 4:
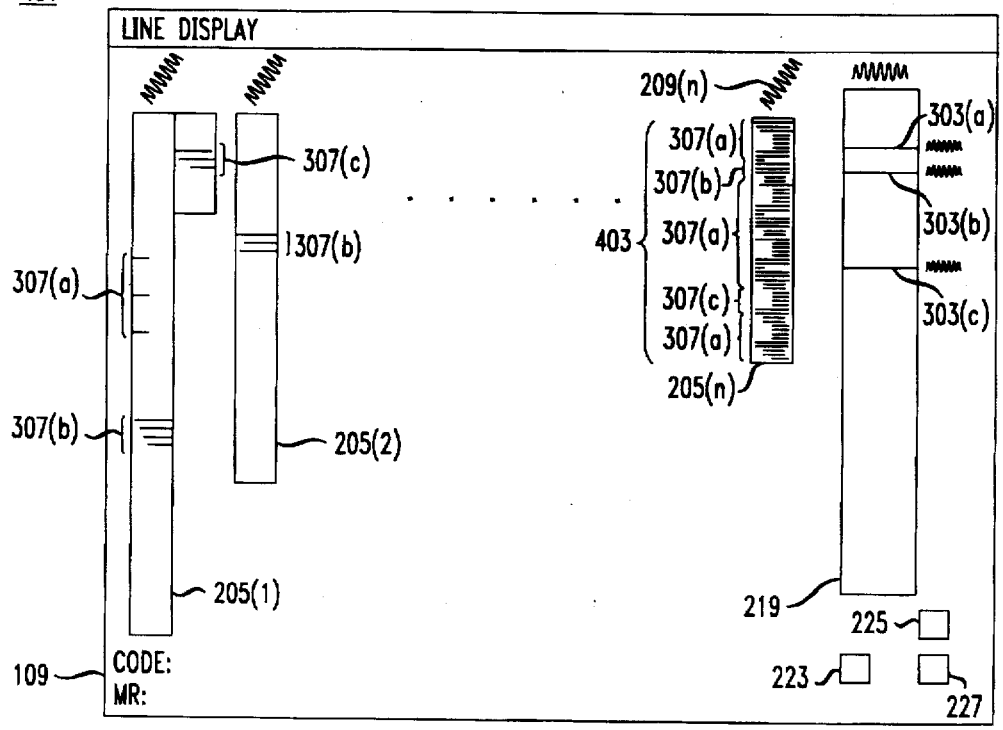
FIG. 4 is a diagram of a third display produced by the preferred embodiment.
Figure 5:
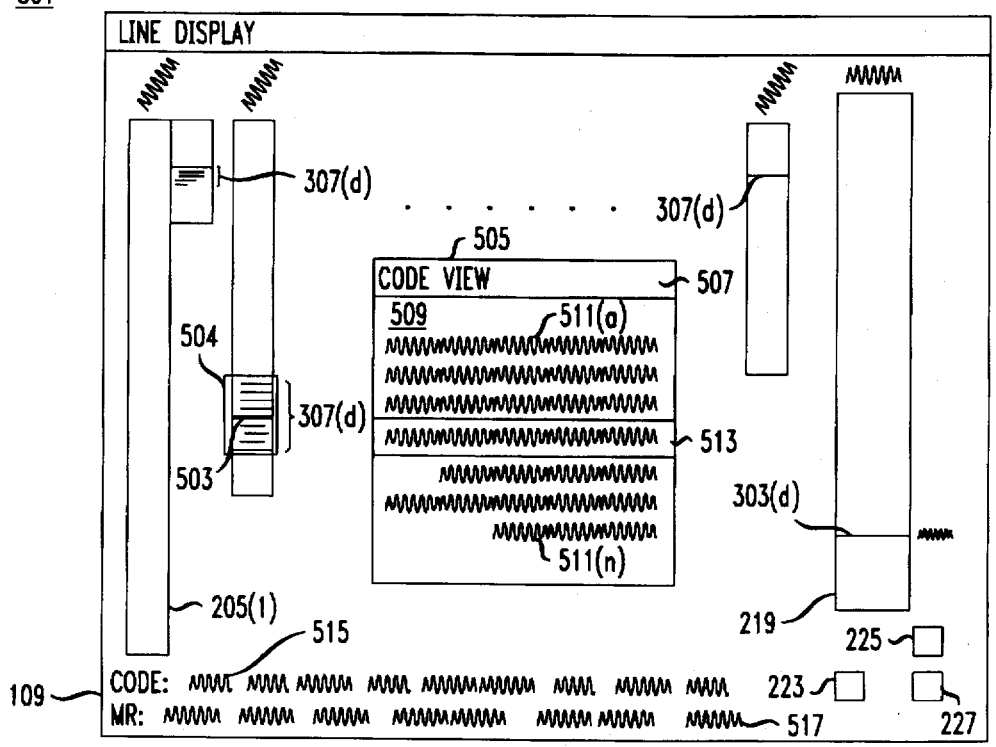
FIG. 5 is a diagram of fourth and fifth displays produced by the preferred embodiment.

Operations on Display 201: FIGS. 3–5

Display 201 shows how a preferred embodiment presents an overall view of information from code body data base 113 about the code body. Using mouse 103, a user of the preferred embodiment may perform operations on display 201 to obtain more detailed information about the code body.

There are four general classes of mouse operations which may be performed on display 201: moving the cursor, selecting an entity at the current location of the cursor, deselecting the entity at the current location of the cursor, and moving a window. To move the cursor, the developer simply moves mouse 103. If no buttons are being pressed, when cursor 110 passes over a line representation 207 or a modification request representation which is turned off (has the color black in a preferred embodiment), the line representation 207 or the modification request representation is turned on (is given the color associated with the relevant modification request) while the cursor 110 is over the line representation or modification request representation. The modification request representation for a given modification request and the line representations 207 for the code lines modified in the given modification request are coupled together so that if the cursor 110 is on the given modification request or on any line representation 207 for any line of code affected by the given modification request, the modification request representation for the given modification request and all of the line representations for the lines affected by the given modification request are turned on.

If the leftmost mouse button being pushed, the line representation or modification request representation under the cursor is turned on and left on after the cursor moves on; the modification request representation and the line representations 207 for the affected lines are coupled as previously described. If the middle mouse button is being pushed, the line representation or modification request representation under the cursor is turned off and left off after the cursor moves; again, the modification request and its corresponding line representations are coupled. If both the left-hand and middle buttons are pushed, the mouse 103 can be used to move components of display 201 about. The use of the right-hand mouse button will be discussed further on.

All of the line representations 207 and modification request representations can be turned on or off by means of label 220 for line characterization column 219. If mouse 103 is moved to label 220 and the leftmost button is pushed, all of the line representations 207 and modification request representations are turned on and left on; if the middle button is pushed, all of the line representations 207 and modification request representations are turned off and left off until the cursor passes over the line representation or modification request representation. In the following, a modification request is described as being active if its modification request and the line representations 207 coupled with the modification request are turned on and left on.

FIG. 3 shows how a developer may employ mouse 103 to obtain more information about one or more modification requests. Display 301 results when all of the line representations 207 and modification request representations have been turned off as just described. As mouse 103 moves cursor 110 across the window, the line representations 207 and their coupled modification request representations over which the cursor passes are turned on; if the leftmost button is depressed at that point, the modification request corresponding to the modification request representation has been activated and the modification request representation and its coupled line representations 207 stay on. Thus, FIG. 3 shows the result after the developer has depressed the leftmost mouse button over modification request representation 303 (1), 303(2), 303(3), and 303(4). The line representations 207 coupled with those modification request representations appear respectively as sets of line representations 307(1), 307(2), 307(3), and 307(4) respectively. When a modification request representation 303 is activated as just described, a label 305 appears to the right of the modification request representation 303. The text of label 305 comes from name record 125 of the modification request record 121 for the modification request. Further, the text 309 of the abstract of the modification request appears following label 216 in bottom field 215. The text comes of course from abstract record 141.

A developer may deactivate a modification request in the preferred embodiment by placing the cursor over modification request representation 303 corresponding to the modification request and pressing the middle button. When the button is pressed, modification request representation 303 is and its coupled line representations are turned off, as are label 305 and abstract text 309. Labels 305 and abstract text 309 do not appear when all modification requests are activated by using mouse 103 to select line characterization column label 220.

Another operation on display 201 is the code file selection operation shown in FIG. 4. Again, code file selection operations are generally performed after columns 205 and line characterization column 219 have been turned off. In the code file selection operation, a code file 115 is selected by using mouse 103 to select column label 209 for column 205 representing the code file 115. In FIG. 4, the selected code file 403 is taken to be that represented by column 205(n). When column label 209 is selected, all of the modification requests which affected the given file are activated. Consequently, the line representations 207 in column 205 (n), all of the modification requests 303 coupled to those line representations, and all of the line representations 207 coupled to the modification requests 303 are turned on. Again, labels 305 and text 309 do not appear.

In FIG. 4, the file represented by file column 205(n) is the result of three modification requests, and thus three modification request representations, 303(a), 303(b) and 303(c). The code lines 207 which were modified in the three modification requests appear in columns 205(n), 205(1), and 205(2) as lines 307(a), 307(b), and 307(c) respectively. Since a file generally includes many lines and is the result of at least several modification requests, the file selection operation does not display text following code label 214 and MR label 216 or labels 305 for MR representations 303. Deselection of column label 209 for a selected column 403 turns off the display of the line representations 307 (a), (b), and (c) in all of the columns 205 and the display of the modification request representations 303 (a), (b), and (c) in line characterization column 219. As can be seen from the foregoing, the file selection operation permits the user to instantly see what modification requests have affected the selected file and how these modification requests have affected the other files of the code body 114.

Another operation possible on display 201 is line selection. When cursor 110 is moved onto a given line representation 207 and the line representation is selected by pressing the leftmost mouse button, the pixels in line representation 207 remain turned on when cursor 110 moves on. Of course the coupled modification request representation 303 and the line representations 207 coupled to that modification request representation 303 also remain turned on and label 305 appears with the modification request representation 303. Thus, in FIG. 5, display 501 shows selected line representation 503, which was modified in the modification request corresponding to modification request representation 303 (d). Line representation 503 is part of one of the sets of line representations 307(d) which were modified in the modification request corresponding to modification request representation 303(d), and the pixels in those line representations are also turned on. The selected line itself appears following the label "Code" in bottom space 215, and the abstract for the modification request corresponding to modification request representation 303(d) appears following the label "MR" in bottom space 215. In FIG. 5, the line of code has the reference number 515, and the abstract has the reference number 517. As may be inferred from the foregoing discussions, the general principal for the appearance of an abstract at 517 and a line of code at 515 is that the current operation on display 201 only specify a single modification request and/or a single line of code. Line deselection is done by moving the cursor across a line representation 207 while the middle button is depressed, and the result is the reverse of the result of line selection.

FIG. 5 also illustrates code view window 505. Code view window 505 displays lines of code preceding and following the line of code represented by line representation 207 at which cursor 110 is presently located. To open code view window 505, the developer using the preferred embodiment employs mouse 103 to select code window button 227. The window then opens, and the developer can use mouse 103 to size the window or change its location. After the developer has opened and sized code view window 505, he may move cursor 110 to a column 205; at that point, a rectangle 504 appears at the position of the cursor in column 205. The rectangle has a horizontal line across its center and has a size which is proportional to that of window 505, i.e., rectangle 504 has space for as many line representations 207 as window 109 has for lines of code. As long as cursor 110 is in a column 205, cursor 110 is at the center of rectangle 504 and rectangle 504 moves with cursor 110. The code lines corresponding to any line representations 207 which are within rectangle 504 appear in window 505.

Rectangle 504 may be detached from cursor 110 by pushing the rightmost button of mouse 103. When that is done, rectangle 504 remains where it was when the rightmost button was pushed and window 505 continues to display the lines of code corresponding to the line representations contained within rectangle 504. Rectangle 504 may be reattached to cursor 110 by again pushing the rightmost button, at which point rectangle 504 moves to where cursor 110 is. Code window 505 is closed by using the standard closing operation for the windowing system.

If columns 205 are split, i.e., display line representations 207 for both added and deleted lines, window 505 is also split, with the added and deleted lines of code being displayed alongside each other. The colors of displayed lines of code 511 are the same as those of the corresponding line representations 207 within rectangle 504. If the corresponding line representation 207 is not turned on, the displayed line is gray. At the center of code display space 509 is displayed line of code 513, which is the line of code corresponding to the line representation 207 at the location of the horizontal line in rectangle 504. In a preferred embodiment, displayed line of code 513 has a different colored background from lines 511. As would be expected, line of code 515 is the same as line 513 and abstract 517 is that for the modification request corresponding to displayed line of code 513. In a preferred embodiment, the code lines visible in code window 505 can be changed only by moving rectangle 504; in other embodiments, the code lines may be moved by scrolling up or down within window 505 and rectangle 504 may move in column 205 as lines are scrolled within window 505.

Figure 6:
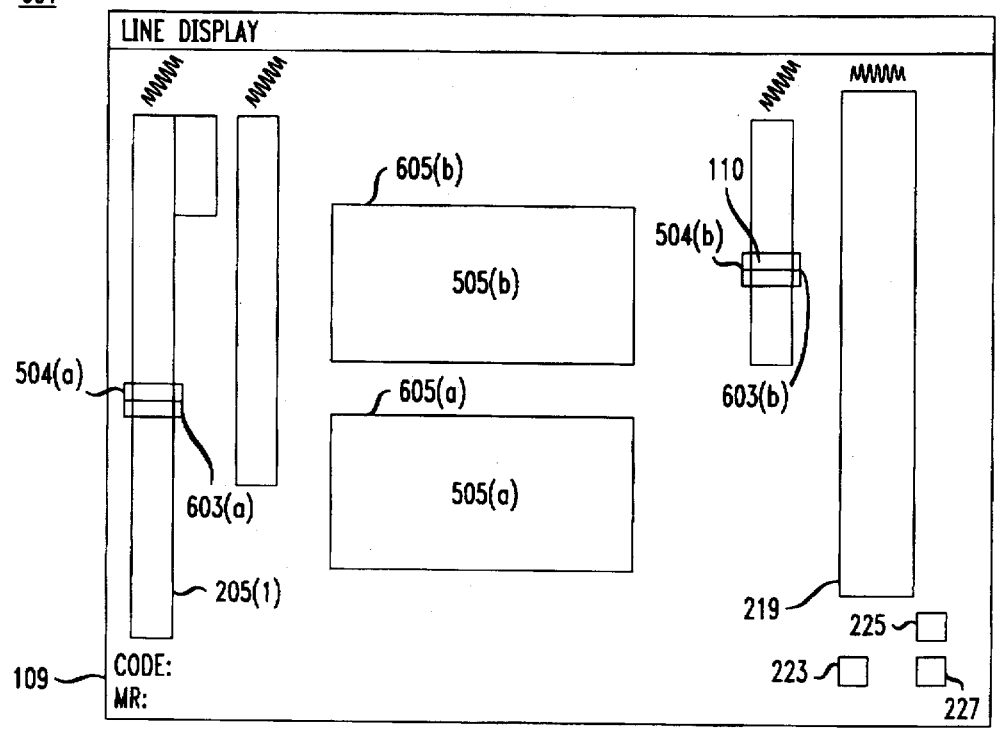
FIG. 6 is a diagram of a sixth display produced by the preferred embodiment.

In a preferred embodiment, there may be up to three code windows 505. By using multiple code windows 505, a developer can compare the code in one portion of the code body with the code in another portion of the code body. FIG. 6 shows a display 201 with two code windows 505(a) and 505(b). Presuming that code window 505(a) already exists and that rectangle 504(a) has been detached from cursor 103, a new code window 505(b) is made by moving cursor 110 to code window button 227 and selecting the button. As a result, window 505(b) is opened and rectangle 504(b) appears and is attached to cursor 110. Window 505(b) can be moved and sized as previously described, and since rectangle 504(b) is now attached to cursor 110, movements of cursor 110 are reflected in window 505(b).

Rectangle 504(b) can of course be detached from cursor 110 as described above. If there is more than one rectangle 504 in display 201 and cursor 110 is attached to none of them, depressing the rightmost button of mouse 103 causes cursor 110 to move to the closest rectangle 504 and causes that rectangle 504 to attach itself to cursor 110. In the preferred embodiment, the border 603 of a rectangle 504 has the same color as the border 605 of the window 505 to which the cursor corresponds, making it easy for the developer to determine which rectangle 504 corresponds to which window 505. As will be apparent to those skilled in the graphic display arts, the techniques which have been just described with regard to code windows 505 and rectangles 504 may be employed in any situation in which a "zoom" window is used to show details about a portion of a display.

The operations on display 201 thus permit a developer to easily and quickly determine what lines of code in the body of code were affected by one or more modification requests, to determine which modification requests are relevant to a given file of code or to a given line in a given file of code, and to display a given line of code and the lines of code in the given line's immediate environment. All of these operations are of course made more useful by the fact that they are performed in the context of the overview of the entire body of code which is provided by display 201. Other aspects of display 201 which are not shown in FIGS. 2–6 but are worthy of mention are the following: in some embodiments, there is a line number scale along the left-hand side of display space 214 and a scale along the left-hand side of line characterization column 219 which indicates degrees of the values associated with the shades of color in line characterization column 219. For instance, in display 201, the shades are associated with dates, and the scale is a date scale.

Implementation of a Preferred Embodiment: FIGS. 7–13

The following discussion of an implementation of a preferred embodiment first describes the hardware in which the invention is implemented, then describes the data structures, and finally describes operation of the preferred embodiment.

Figure 7:
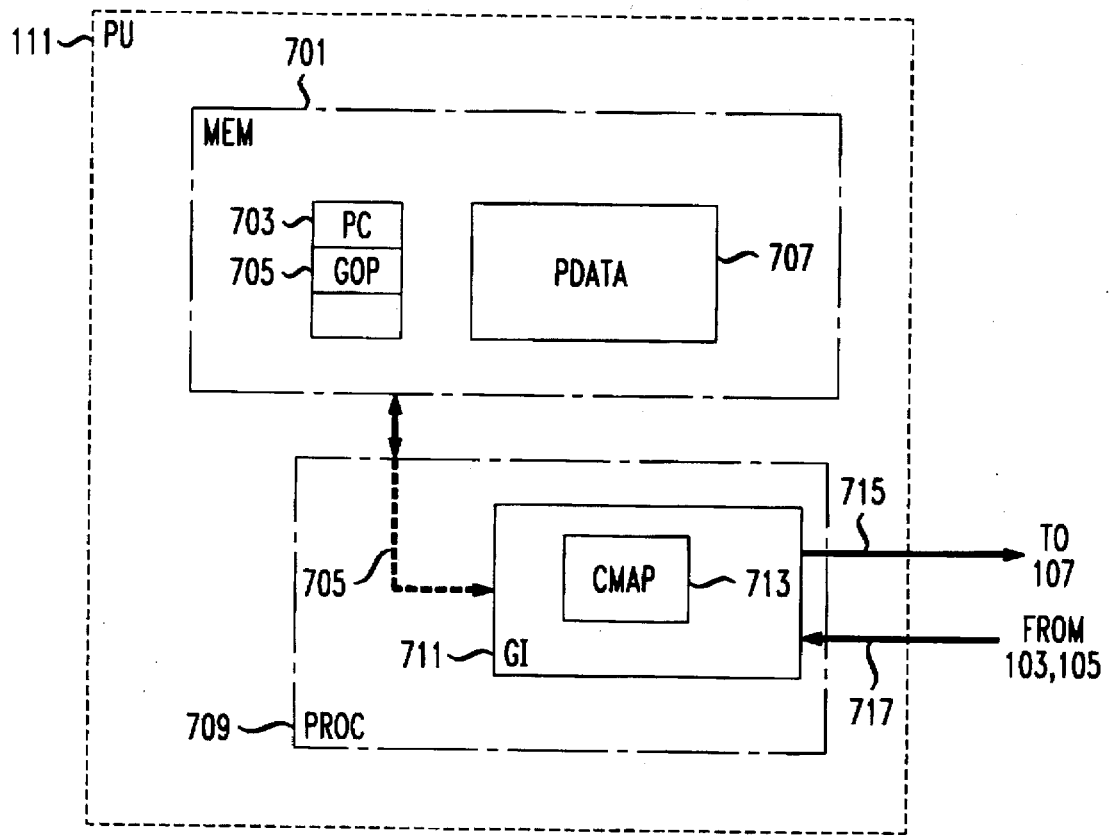
FIG. 7 is an overview of the hardware employed in the preferred embodiment.
Figure 7:
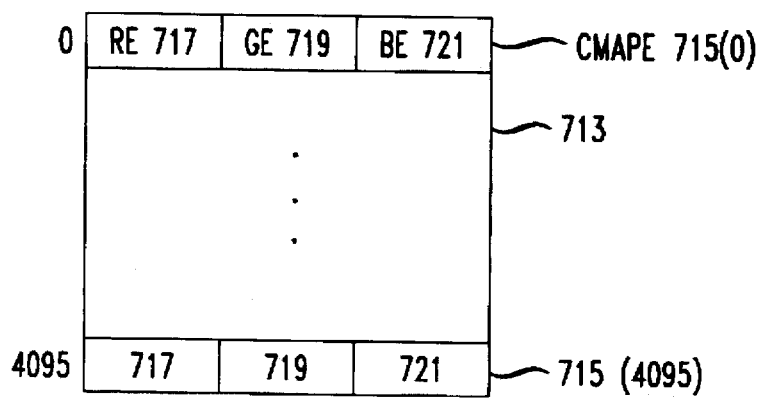

Hardware employed in a Preferred Embodiment: FIG. 7

A preferred embodiment of the invention is implemented using a Silicon Graphics 4D/35 processor running the Personal IRIS operating system. FIG. 7 is a block diagram of processing unit 111 employing the Silicon Graphics 4D/35 processor. Processing unit 111 has two main components: memory (MEM) 701 and processor (PROC) 709. Stored in memory are program code 703, which is a program employed to implement the preferred embodiment, and program data (PDATA) 707, which is data employed in the implementation. Under control of program code 703, processing unit 709 uses program data 707 to create the displays which have just been described on display 107.

Processing unit 111 is specially designed to produce graphics displays. Included in processing unit 111 is graphics interface 711, which controls display 107 and responds to inputs from keyboard 105 and mouse 103. Graphics interface 711 is controlled by graphics operations 705 in program code 703. The graphics interface is described in detail in *Graphics Library Reference Manual, C Edition*, Document Number: 007-1203-040, Silicon Graphics Computer Systems, 1991. As already mentioned, the displays of the preferred embodiment employ colors; the colors used in the display are defined by color map 713 in graphics interface 711. As shown in detail in the lower part of FIG. 7, color map 713 has 4096 color map entries (CMAPE) 715. Individual color map entries 715 are indexed by values ranging from 0 through 4095. Each color map entry contains three fields, a red field 717, a green field 719, and a blue field 721. The values in these fields determine the intensity of a red color component, a green color component, and a blue color component, and thus define a color. For example, for the color black, all three fields have the value.

Three of the graphics operations 705 manipulate color map 713:

color (<color map index>) specifies a color by specifying an index of a color map entry 715. The next pixels written in display 107 will be written in the color defined by the specified color map entry 715.

mapcolor(<color map index>, <red value>, <green value>, <blue value>) sets the fields in color map entry 715 specified by the index value to the values specified in the remaining arguments.

getmcolor(<color map index>, <red loc>, <green loc>, <blue loc>) writes the present values of the fields of the color map entry 715 specified by the index value to the locations in memory 701 specified by the remaining arguments.

Color map 713 can thus be used to create a "palette" of colors for use in display 107 and then to employ the colors in display 107. Further, the current contents of color map 713 can be saved in memory 701 for later reuse.

Figure 8:
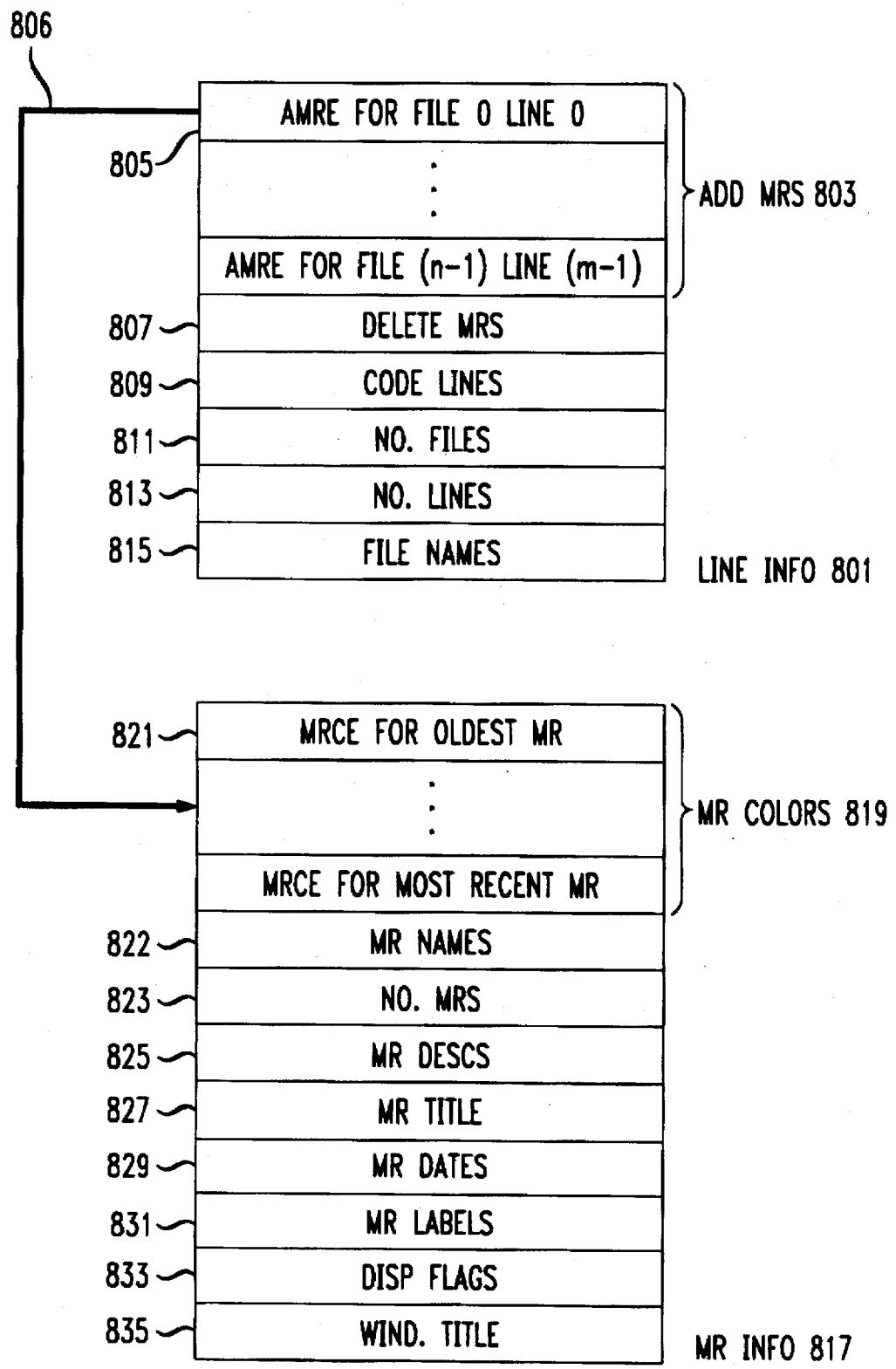
FIG. 8 is an overview of data used in the preferred embodiment.

Line and MR Data: FIG. 8

To provide for speed of operation of the preferred embodiment, the data from code body data base 113 which is the basis of the displays is copied from code body data base 113 to memory 701, where it forms part of program data 707. The copying is performed as part of a preprocessing operation which will be described in detail later. FIG. 8 shows the form of the data in memory 707. The data falls into two groups: line information 801, which is information concerning the lines of code in the code body, and modification request (MR) information 817, which is information concerning the modification requests corresponding to the lines of code.

The preprocessing operation sorts both the files in the code body and the modification requests. In a preferred embodiment, the files are sorted by file name; the modification requests are sorted by the values with which the colors are associated; in the present example, those values are the values of date record 139. In other embodiments, the modification requests may be sorted by other values, for example, by developer names from developers 143.

Beginning with line information 801, the first piece of information relates added lines of code to the modification requests which added the lines. Add modification requests 803 is an array which has one entry for every code file line record 118 whose AMR field 120 indicates that the line has been added. The entries for each file are in the order in which they occur on the file and the sets of entries for the files are arranged in the order in which the files were sorted. Each add modification request entry 805 contains a pointer to a location in modification request information 817 which specifies the color which is associated with the modification request which added the line.

Delete modification requests 807 is an array like add modification requests 803, except that it contains entries for each deleted line. Again, each entry has a pointer to a location in modification request information 817 which specifies the color which is associated with the modification request which deleted the line. Code lines 809 is the text of the lines of code in the body of code. The lines are arranged in the order in which they occur in the files and the files are arranged in the sorted order. Number of files 811 is an integer which specifies the number of files, and number of lines 813 is an array of integers which specifies the number of lines in each file. The integers for the files are arranged in the order into which the files were sorted. File names 815 is an array of the names of the files, again arranged in the order into which the files were sorted.

Continuing with modification request information 817, the first part of that data is an array specifying the colors associated with the modification requests. Modification request colors 819 contains an entry 821 for each modification request which affected the body of code. The entry for a given modification request appears in a location in the array which corresponds to the location of the modification request in the sorted list of modification requests, i.e., in this case, the first entry 821 is for the oldest modification request, and the last entry 821 is for the youngest modification request. As part of the preprocessing, color map 713 was set up so that there was a set of color map entries 715 corresponding to the modification requests. In that set, the colors were arranged so that the entry 715 corresponding to the oldest modification request was given the color blue, the entry 715 corresponding to the youngest the color red, and the others the colors in between. Each entry 821 contains the index in color map 713 of the color which corresponds to the modification request represented by the entry 821.

MR Names 822 is an array of the names of the modification requests. The information comes from modification request name field 125. Again, the names are in the order in which the modification requests were sorted. Field 823 specifies the number of modification requests; modification request descriptions 825 is an array which contains the abstracts 141. MR title 827 is the title which appears above line characterization column 219; it is provided as a parameter during preprocessing. MR dates 829 is an array of the dates, as specified in date field 139; again, the oldest date is the first element and the youngest the last. MR labels 829 are data used to label the MRs in line characterization column 219. The labels are in the order into which the modification requests were sorted. Display flags 833 are flags which indicate the appearance of display 201 before any input from the developer, for example, whether the split display is used at that point. Window title 835, finally, is title 203 of window 109. Both the flags and the title are provided as parameters.

The effect of the production of line information 801 and modification request information 817 from code body data base 113 is that all of the information which would result from certain queries to code data base 113 is contained in line information 801 and modification request 817 and is immediately available to the preferred embodiment. The preferred embodiment can thus provide substantially instantaneous displays of the results of those queries.

Figure 9:
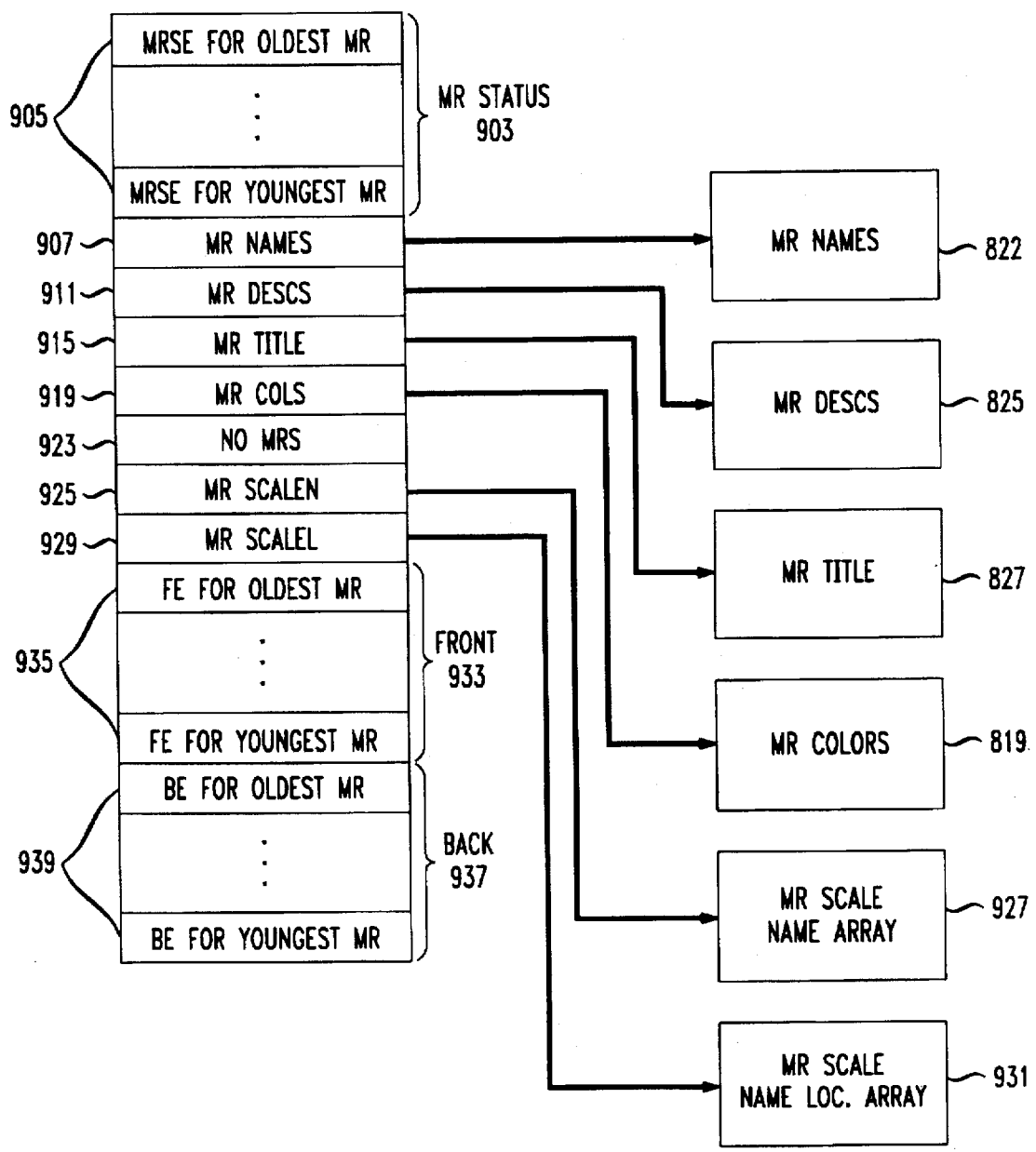
FIG. 9 is a diagram of the MR object employed in the preferred embodiment.
Figure 10:
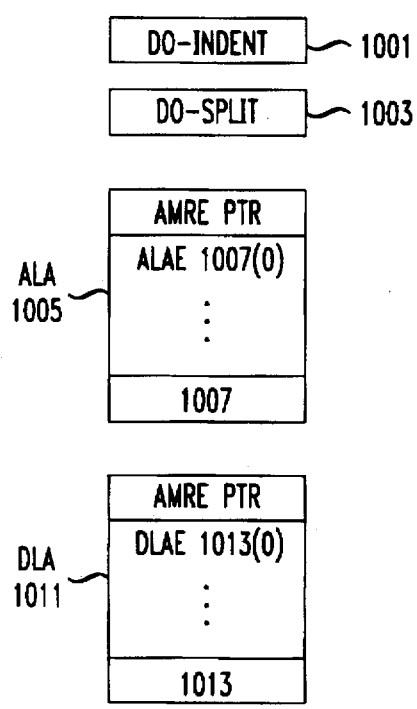
FIG. 10 is a diagram of other data used in the preferred embodiment.
Figure 11:
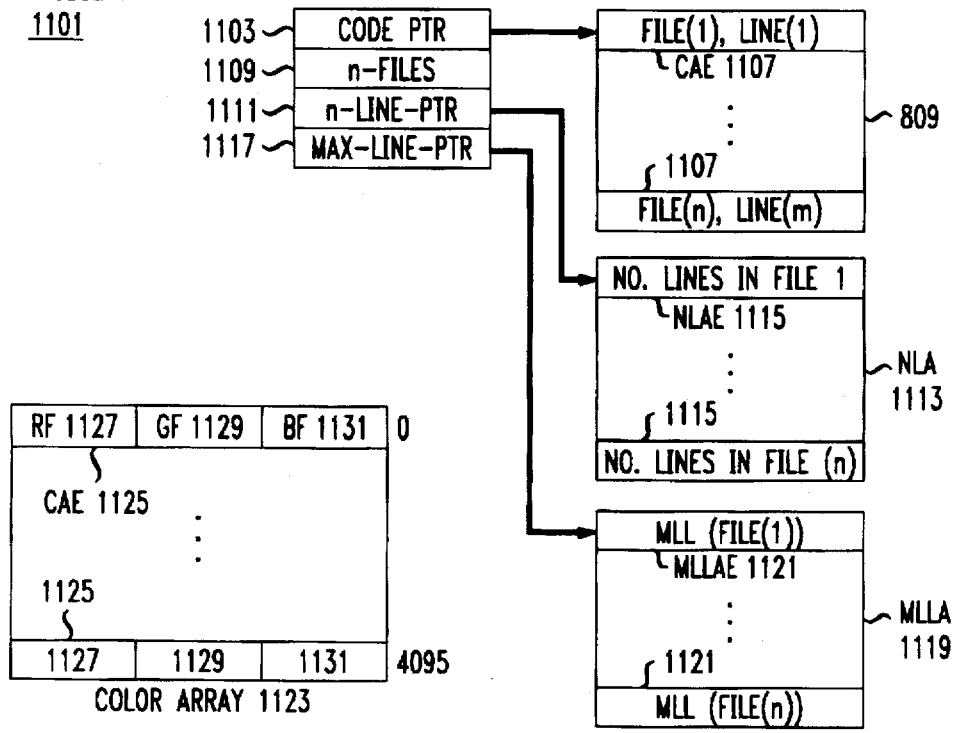
FIG. 11 is a diagram of a code object and other data used in the preferred embodiment.

Objects Employed in the Preferred Embodiment: FIGS. 9–11

The source code for program code 703 for the preferred embodiment is written using the C++ programming language, described in Bjarne Stroustrup, *The C++ Programming Language*, Addison-Wesley, Reading, Mass., 1987. C++ is an object-oriented language, and consequently, objects are employed in the source code to represent the modification requests and the code.

FIG. 9 shows data structures employed in modification request object 901, which represents the modification request. The first data structure is modification request status array 903. There is an entry 905 in array 903 for each modification request, and the entries are arranged in order from oldest to youngest. Each entry may have one of four status values: neither marked nor active, marked, active, and both marked and active. The "marked" status indicates that the modification request's label 305 is to be displayed; the "active" status indicates that the modification request is active.

Fields 907 through 919 are pointers to parts of MR INFO 817. MR NAMES 907 points to MR NAMES 822; MR DESCS 911 points to MR DESCS 825; MR TITLE 915 points to MR TITLE 827; MR COLS 919 points to MR COLORS 819. Field 923 indicates the number of modification requests; MR SCALEN 925 points to an array which contains the scale labels for line characterization column 219; MR SCALEL 929 points to an array which contains the locations for the labels.

The arrays FRONT 933 and BACK 937 are Boolean arrays. There is one element in each array for each modification request, and the value of the element indicates whether the modification request representation 303 and the line representations 205 coupled thereto are to be displayed on display 201 in black or in the color associated with the modification request. There are two arrays so that display 201 can be redrawn from FRONT while BACK 937 is being modified to incorporate the changes resulting from the movement of cursor 110 and the positions of the buttons on mouse 103.

FIG. 11 shows data structures belonging to code object 1101, which represents the code of the body of code. Code pointer 1103 points to code lines 809 in line info 801; as shown in FIG. 11, the lines are organized in order for each file, with the files in the sorted order. Number of files 1109 indicates the number of files with code in code lines 809. Number of lines pointer 111 points to a number of lines (NLA) array 1113, which contains an entry 1115 for each of the files in 809 which indicates the number of lines in that file. The order of the entries is again the sorted order of the files. Maximum line pointer 1117, finally points to maximum line length array 1119, which has an entry 1121 for each file. The entry for a file indicates the length of the longest line in the file. The line length information is used to properly size line representations 207.

FIG. 11 also shows color array 1123, which is an array in memory 701 which is parallel to color map 713 and which retains the relationship between modification requests and colors originally set up in color map 713. There is a color array entry 1127 in color array 1123 corresponding to each color map entry 715, and like a color map entry 715, color array entry 1125 specifies a color by means of values in a red field 1127, a green field 1129, and a blue field 1131.

FIG. 10 shows other relevant data structures employed in the preferred embodiment. The variable "do_indent" indicates by its value whether line representations 207 are to show indentations. The value is set when cursor 110 is moved over button 223 and the left mouse button is pushed. The variable "do split" indicates by its value whether line representations for the added lines, the deleted lines, or both are to be displayed. Its value is set when cursor 110 is moved over button 227. Both may also be set from values in display flags 833 at the beginning of execution of program code 703. Added line array 1005 is an array of pointers to entries 805 in add modification request array 803; each of the entries 805 in turn points to an entry in MR Colors 819. Similarly, deleted line array 1011 is an array of pointers to entries in delete modification requests 807. These structures thus serve to link lines of code to the relevant modification requests.

Figure 12:
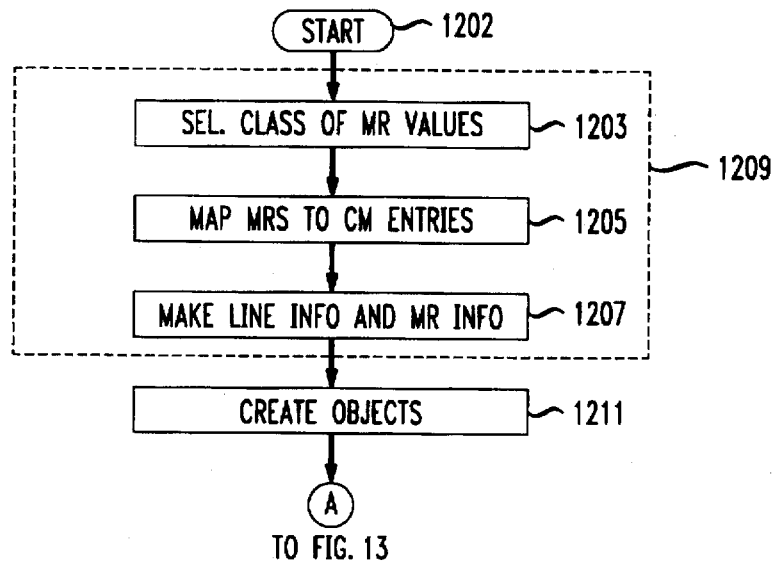
FIG. 12 is a first part of a flowchart showing operation of the preferred embodiment.
Figure 13:
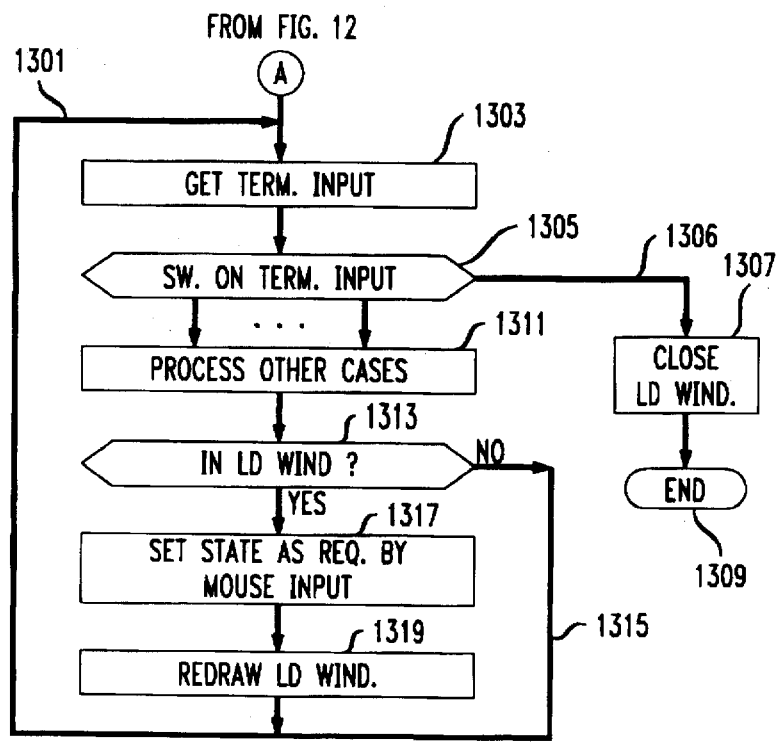
FIG. 13 is a second part of a flowchart showing operation of the preferred embodiment.

Operation of the Preferred Embodiment: FIGS. 12 and 13

FIGS. 12 and 13 together contain flowchart 1201, which presents a high-level view of the operation of the preferred embodiment. Beginning with FIG. 12, the first part of the operation of the preferred embodiment is preprocessing 1209, which prepares line info 801 and MR info 817 from data in code data base 113. The first step in the preprocessing is 1203. In that step, a class of values is selected for association with colors in color map 713. In the example we have been following so far, the selected class of values was the date on which each of the modification requests was completed; however, it is equally possible to select other classes of values. For example, if it is desired to see which code was written by which developers, the sets of developers specified in developer records 103 can be selected as the class of values and a different color can be associated with each set of developers. In the preferred embodiment, selection of the class of MR values is done in response to a parameter provided to the program which does the preprocessing.

The next step is to map the modification requests to entries 715 in color map 713. In the preferred embodiment, this is done by sorting the values of the selected class of MR values, mapping the sorted values onto entries 715, and then associating each modification request with the color onto which the selected value for that modification request was mapped. In the date example, the dates were sorted from earliest to latest, and were mapped in that order on color map entries 715 representing colors ranging from blue through green, yellow, and orange to red. Each modification request has a date, and the color onto which the modification request's date is mapped becomes the modification request's color. The results of the mapping of the selected values to the colors and of the association of the colors with the modification requests are recorded in MR colors 819, where each entry 821 for a MR contains the index of color map entry 714 for the color associated with date 139 for the given modification request.

The last step in preprocessing 1209 is to make line info 801 and MR info 817. As previously indicated, most of the information in these data structures comes from code body data base 113. Information about lines of code and the lines themselves are ordered by sorting the file names and putting the lines in the files in the order of the sorted file names; information about MRs are ordered by the sorted order of the values which were mapped onto color map 713. The values of display flags 813, MR title 827, and window title 835 are provided by parameters to the preprocessing program.

MR Info 817 and line info 801 are arguments to the program which actually produces and manipulates display 201. The first step in that program, step 1211, is to create objects including window 109 and then initialize data in the objects using values from the arguments. Among the operations performed at this point is copying the current values of color map entries 715 into the corresponding entries of color array 1123.

Once these initializations are done, main loop 1301 (FIG. 13) can begin executing. The first step in main loop 1301 is to get the value at the head of a queue of inputs from keyboard 105 and mouse 103. That value determines what happens next; if it indicates that the line display window in which display 201 appears is to be closed (branch 1306), the actions necessary to close the window are taken and the program which implements the preferred embodiment terminates, as shown in boxes 1307 and 1309.

Otherwise, the other cases are processed in 1311; no matter what case is processed, the next step is decision box 1313: if cursor 110 is in the line display window, the next step is 1317; otherwise it is 1303. In step 1317, program state is set as required by the mouse input. Some examples are the following:

If the mouse is in display space 213, the following occurs:
  If the cursor has passed over a line representation 207 or a modification request representation 303, entry 935 in FRONT array 933 for the modification request which modified the line represented by the line representation or which is represented by the modification request representation is set to TRUE.
  If the leftmost button was down when the cursor passed over the line representation 207 or modification request representation 303, MR status entry 905 for the modification request is set to "both marked and active".
  If the center button was down when the cursor passed over the line representation 207 or modification request representation 303, MR status entry 905 for the modification request is set to "neither marked nor active" and the entry in FRONT array 933 for the modification request is set to FALSE.

If the cursor is in top space 211, the following occurs: if the cursor 110 is on a file name 209, state is set so that the name will be white if the left button was pushed, red if the center button was pushed, and otherwise yellow. Then a loop is executed which does the following for each line in the file identified by the label: depending on whether the display is showing added lines, deleted lines, or both, it uses added line array 1005 and/or deleted line array 1011 to locate the entry in MR colors 819 which contains the index in color map 713 for the modification request associated with the added or deleted line. The entry in BACK 937 for that modification request is set to TRUE; if the left button is down, the state in that MR status entry 905 is set to active (or both active and marked if it was already set to marked). If the right button is down, the entry in BACK 937 for that modification request is set to FALSE and the state in that MR status entry 905 is set to neither marked nor active.

If the cursor is in right space 217, what happens depends on whether it is on line characterization column label 220 or in column 219. In the first case, state is set to change label 220's color as described for the file names 209; then, if either the left or middle button is down, for each modification request, entry 905 for the modification request in MR status array 903 is examined to determine whether its status is "marked" or "marked and active" and the status saved; next, the entry for the MR in MR status array 903 is set as required by the mouse buttons: if the left button is down, the status becomes active and the entry for the MR in BACK 937 is set to TRUE; if the center button is down, the status becomes neither marked nor active and the entry for the MR in BACK 937 is set to FALSE. Then, if the saved status of the MR is not "marked" or "marked and active", the current status of the MR is set to "active" only. The effect of this is to ensure that only those labels 305 for modification request representations 303 which were on prior to selection of column label 220 remain on when all of the modification request representations are activated.

If the cursor is in line characterization column 219, the position of cursor 110 is converted into the number of the modification request represented by the modification request representation at the cursor. The conversion is possible because the modification request representations 309 have the same order in column 219 as the modification requests have in modification request colors 819. The entries in modification request status array 903 and BACK array 937 for the modification request are then set as follows:

Whether or not any button is down, the BACK array entry is set to TRUE;
  if the leftmost button is down, the status array entry is further set to the value "marked and active";
  if the center button is down, the BACK array entry value is reset to FALSE and the status array entry is set to the value "neither marked nor active".

An important effect of setting state as described in the foregoing discussions of the actions taken when cursor 110 is in display space 213, top space 211, or right space 217 is that the BACK array entry 939 for each modification request which was "turned on" by cursor 110 when cursor 110 passed over the modification request representation 303 for the modification request or the line representation 207 of a line affected by the modification request is set to TRUE. Further, if the leftmost or center mouse button was depressed, the MR status entry 905 for the modification request was set as required by the button, and in the case of the center mouse button, the BACK array entry 939 was set to FALSE. It is thus possible by examining BACK array 937 to determine which line representations 207 and modification request representations 303 are to be turned on as a result of the movement of cursor 110 and by examining MR status array 903 to determine which line representations 207 and modification request representations 303 are to remain on because they were selected by means of the leftmost mouse button.

Bottom space 223, finally, contains only buttons 223,225, and 227. In the case of indent button 223 and code display type button 227, selection or deselection of the buttons changes the state of the static variables do_indent and do_split; the effect of the code view button 225 will be described in more detail later.

The final step in setting up the state is setting up color map 713 so that the color map entries 715 corresponding to the modification requests whose modification request representations 303 and associated line representations 207 are to be turned on are set to the color associated with the modification request and the color map entries 715 corresponding to the modification requests whose modification request representations 303 and associated line representations 207 are not to be turned on are set to black. Color map 713 is set up by performing a loop which for each modification request first compares BACK array entry 939 for the modification request with the FRONT array entry 935 for the modification request; if they are different, indicating that a modification request has been turned on or off, the index of that modification request's color map entry 715 is saved. Then, if the BACK array entry 939 for the modification request is TRUE, the "mapcolor" function is used to set the modification request's color map entry 715 to the values in the modification request's color array entry 1125; otherwise, "mapcolor" sets the modification request's color map entry 715 to black; thereupon, BACK array entry 939 is copied to FRONT array entry 935. This last step of course ensures that FRONT array 933 always contains the immediately previous state of BACK array 937. Finally, label 214 and any code line 515 being displayed and label 216 and any modification request abstract 517 being displayed are drawn in bottom space 215.

Returning to flow chart 1201, In the next step, 1319, display 201 is redrawn in accordance with the state that was set in step 1317 or in earlier iterations of loop 1301. In a preferred embodiment, only those parts of display 201 which have changed as a result of the mouse input are redrawn. For example, if the input concerns only display space 213, only that space is redrawn. Redrawing is done by copying the current display buffer into an empty buffer, redrawing those parts of the empty buffer which have changed, and then swapping the buffer with the redrawn display with the buffer from which display 201 is currently being displayed.

Redrawing of the various spaces is as follows: if display space 213 needs to be redrawn, a loop is executed in which column 205 for each file in the body is drawn. The column is drawn by means of the following loop: for each line of the file, the line stored in code lines 809 is first examined to determine its length and the number of leading blank spaces; then, if the variable do_indent 1001 indicates that indent button 223 was pushed, the length and starting point of line representation 203 is set accordingly; otherwise line representation 203 is the width of column 205.

Next, the line representation is drawn using the index into color map 713 specified for the line's modification request in added line array 1005, deleted line array 1011, or both, depending on whether display 201 is showing added lines, deleted lines, or both. As indicated above, if line representations 207 for the line's modification request are to be turned on, the modification request's entry in color map 713 is set to the color specified for the modification request in color array 1123; if the line representations are to be turned off, the modification request's entry 715 is set to black.

Continuing with top space 211, top space 211 is redrawn by a loop which writes each file's file name 209 above column 205 for the file. The drawing of bottom space 215 adds the current state of buttons 223,225, and 227 to labels 214 and 216 and code and abstract lines 515 and 517.

Right space 217 is redrawn as follows: line characterization column 219 is drawn by a loop which is executed for each modification request. The loop obtains the modification request's index in color map 713 from MR colors 819, uses the color function to set the color to be written to that color, and then draws modification request representation 303; consequently, modification request representation 303 is the color for the modification request in color map 713; as indicated above, that color is black if the modification request has not been "turned on" and otherwise, the color associated with the modification request in color array 1123. Further, if MR status array entry 905 for the modification request is in the state "marked" or the state "marked and active", label 305 for the modification request is drawn next to the modification request representation. Label 305 has the same color as the modification request representation. Finally, in the preferred embodiment, the modification request date scale is drawn to the right of line characterization column 219 and title label 220 is drawn above line characterization column 220.

Implementation of Code Viewers: FIGS. 5,6, and 14

As explained in the discussion of FIG. 5, when code window button 227 is pushed, the result is the appearance in display 201 of a code window 505 and an associated rectangle 504. When rectangle 504 is positioned over a group of line representations 207, code window 505 displays the lines represented by those line representations 207. Rectangle 504 and code window 505 together make up a code viewer. The preferred embodiment may have up to three code viewers. They are implemented as an array of code viewer objects. FIG. 14 shows the data employed to implement a code viewer object. The data falls into four categories: code window information 1403, which describes the lines being displayed in the code viewer's code window 505, file information 1415, which describes the file from which the lines are being displayed, rectangle information 1431, which describes rectangle 504 for the code viewer, and code viewer status 1439, which indicates whether the code viewer is attached.

Beginning with code window information 1403, the data is the following:

- maximum lines 1405 indicates the maximum number of lines which can be displayed in window 505;
- first display line offset 1407 is the offset of the first line being displayed in window 505 from the first line of the file in code lines 809;
- last display line offset 1409 is the offset of the last line being displayed in window 505 from the first line of the file in code lines 809;
- display mode pointer 1411 is a pointer to the variable do_split, which indicates whether added lines, deleted lines, or both are to be displayed; and
- last display mode 1413 indicates the display mode which was in use the last time window 505 was redrawn.

Continuing with file information 1415, that data includes:

- File line pointers 1417, which includes a pointer 1419 to the first line in code lines 809 of the file from which lines are currently being displayed in code window 505, a pointer to the line at which the center of rectangle 504 is currently positioned, and a pointer to the last line of the file.
- First added line array entry pointer 1427 points to the entry for the first line of the file in added lines array 1005; and
- first deleted line array entry pointer 1427 points to the entry for the first line of the file in deleted lines array 1011.

File information 1415 thus provides all of the information needed locate the lines in the file which are currently being displayed in the code window and to display the lines in colors corresponding to the line representations 207 for the lines.

The remaining information defines rectangle 504 and indicates whether the code viewer is attached. Rectangle information 1431 consists of the coordinates 1433 and 1435 of the center of the rectangle and the color of the outline used for the rectangle and for the associated code window. Code viewer status 1439 has the value TRUE if the code viewer is attached and otherwise FALSE.

Continuing with details of the creation and operation of a code viewer, if a developer activates button 227 with the mouse when there are less than three code viewers in display 210, the result is the creation of a new code viewer. In the course of creation, display mode 1411 is set to the current value of do_split 1003, pointers 1417 are all set to NULL, the color for the new code viewer's borders are determined, minimum sizes for code window 505 and rectangle 504 are set up, and code viewer status 1439 is set to TRUE. The developer then uses the mouse to size the window and rectangle 504 is sized proportionally to the window size.

When there are code viewers in display 207, it is necessary each time the cursor is moved to determine what the relationship is between the cursor and the code viewers. If there is an attached code viewer, cursor 110 is of course attached to that code viewer; otherwise, the program computes for each code viewer the distance between the code viewer's rectangle 504 and the current position of cursor 110 (contained in rectangle info 1431); if the rightmost mouse button has been pushed, the code viewer whose rectangle 504 is closest to the cursor position is then attached to cursor 110. If there is an attached code viewer when the rightmost mouse button is pushed, that code viewer is detached.

The next step is to relate the currently-attached code viewer to the current cursor position. If the cursor is in a column 205, the program has previously determined which file is represented by that column. To relate the code viewer to the lo current cursor position, the program sets FFL PTR 1419 to point to the first line in that file, LFL PTR 1423 to point to the last line, and CFL PTR 1421 to point to the current line in the file. First ALAE 1425 and FIRST DLAE 1427 are further set to point to the first entries in added line array 1005 and deleted line array 1011 for the file. Finally, the x and y coordinates 1433 and 1435 are set from the coordinates of the current cursor position.

Creation of a code viewer, attaching it, and relating it to the current cursor position all occur in step 1317 of flow chart 1201, in which the state for the display is set as required by the mouse input. If anything has occurred to change the state of a code viewer, that code viewer is then redrawn in step 1319, redraw line display window. How the code viewer is redrawn depends upon the value of display mode 1411. However, in all cases, the first step is to redraw rectangle 504. Next, the required lines are drawn in code window 505 by determining the first line in code window 505 and then drawing lines until the maximum number of lines in the window is reached. As each line is drawn, the entry for the line in added line array 1005, delete line array 1011, or both (in the case of a split display) is used to determine the index for the modification request in color map 713, the color for the modification request is fetched from color map 713, and the color is then used to draw the line of code.

Other Uses of the Display Techniques: FIG. 15

The display techniques which are used in the preferred embodiment to provide developers with a variety of overviews of a large body of code and to give them access at the same time to interesting portions of the code may be used in any situation where overviews combined with detailed access are useful. In many of these situations, the display will include visual representations of entities which contain visual representations of subentities. In the preferred embodiment, the visual representation of the entity is column 205, representing a code file, while the visual representation of the subentity is line representation 207, representing a line of code in the code file. In the following, a number of examples of other uses of the display techniques are described.

For instance, columns 205 might represent categories of records in a data base and line representations 207 might represent individual records in a category. A data base search for certain information contained in the records might be done on the data base, and the line representations 207 which resulted in hits might be displayed in a certain color. As a result, the user would be able to see how the hits related to the categories of records represented by the columns. Further, more than one search could be done and different colors could be associated with each search and with hits from more than one search. The user could then see how different searches related to the records in the data base, to each other, and to the categories. Such a system could also include one or more "record viewers" which worked generally like the code viewers disclosed in the present application and which permitted users to examine individual records.

The techniques used in the preferred embodiment to display the history of the body of code could be used with an inventory data base to provide an overview of the inventory. For example, if the line representations 207 represented items of inventory and the inventory data base contained the time at which an item entered inventory, the colors of the line representations could show how long the items had remained in inventory. In this case, the columns might represent categories of inventory items. Similarly, if the data base contained information from which the rate of turnover of inventory items could be determined, the colors might represent the rate of turnover. In such applications, the record viewers would give access to details about the inventory items.

Another use of the techniques would be to gain an overview of the sales of items, in such an application, each column might represent a sales outlet, the line representations 207 might be arranged so that the line representation for a given item was at the same position in each of the columns, and the color might show what the range of sales was. The display would thus permit easy comparison of what the outlets were selling and how much they were selling. Again, the record viewers would give access to details about the sales of individual items or groups of items and would permit detailed comparison of the results of different sales outlets.

There are of course many data bases in which the primary information stored in the data base is lines of text. The techniques disclosed herein with regard to lines of code are of course directly applicable to such data bases. For example, in a legal data base, a column 205 might correspond to a section of the code of laws, the line representations might represent lines in the section, and the colors might be used to indicate the legislation which caused the lines to be added to the code. The colors could also be used to relate lines of code to cases which construed them. In such an application, the code viewers could be used not only to view the lines of the law code, but also to view information such as annotations, relevant portions of the record made when the legislation which added the lines was past, and decisions interpreting the lines.

Another application of the techniques in a data base consisting of lines of text would be to use colors to represent cross references: if a line or a set of lines had cross references to other lines, then all of those lines would appear in the same color. The same technique could be used in data bases which have concordances: the user could select a word from the concordance, and all of the line representations for lines containing the word would be given the same color. In this application, the code viewers could be used to view and compare the lines containing the word. In the preferred embodiment, the split option is used to simultaneously show added and deleted lines; in other embodiments and applications of the invention, it could be used to compare different versions of the code or different versions generally of two texts.

In the preferred embodiment, lines of code in a file have a linear order, and consequently, columns 205 are a natural representation for the files. The techniques can, however, be used in situations where the data items are arranged in a table. For example, the techniques could be used to display a number of spreadsheets simultaneously. Each spreadsheet would appear as a table in which each line representation 207 represented a cell of the spreadsheet. Colors of line representations 207 could be used to indicate information such as cell type, the kind of information contained in the cell, dependencies among the cells, or the time the cell was last modified. In this case, the code viewers would be used to examine individual cells or groups of cells. Line representations 207 could of course be employed in three-dimensional displays in the same fashion in which they are employed in linear and tabular displays.

As is apparent from the foregoing, the techniques disclosed herein are fundamental innovations in the art of displaying information, and their application is limited only by the imaginations of those who need information and of those who build displays for them. There is, however, one area of information display technology for which the technology is particularly well-suited. That area is text editors.

In modern text editors, editing is done on displayed text. The display of the text may occupy an entire display screen, or it may be in a window 109 in a display screen. A component of most modern text editors is a scroll bar, a bar at one side of the display. The scroll bar represents the entire text file being edited. To go to the middle of the file, the user moves the cursor to the middle of the scroll bar; to go to a point ⅔ of the way down the file, he moves the cursor to a point ⅔ of the way down the scroll bar. Further, there is often a shaded area in the scroll bar which shows the position of the lines being displayed in the screen relative to the whole file. A difficulty with modern editors is that there is no level of detail displayed between that provided by the scroll bar, which represents the entire document, and that provided by the small number of lines of the document which are visible in the display. Such a level of detail may be provided by the techniques implemented in the preferred embodiment.

FIG. 15 shows display 1501 for a text editor which employs the techniques of the preferred embodiment. Display 1501 is presumed in the following to be displayed in a window 1503 on a display 107. At the top of window 1503 is title bar 1505, followed by menu bar 1507, which is used to select operations on the text being edited. The text is displayed in text display 1513, where it appears as text lines 1517. To the right of text display 1513 is scroll bar 1511. Scroll bar 1511 has a line representation 207 for every line in the text file being edited. If there are more line representations 207 than can be displayed in a single scroll bar 1511, a continuation scroll bar appears next to scroll bar 1511. To select a line in the text file, the user moves cursor 110 into scroll bar 1511. When cursor 110 is in scroll bar 1511, it is attached to a rectangle 504 which covers as many line representations 207 as display 1513 contains lines 1517. The lines 1517 corresponding to the line representations 207 inside rectangle 504 are displayed in text display 1513. The line 1519 whose line representation 207 is crossed by the horizontal line at the center of rectangle 504 appears at the center of text display 1513. Line 1519 may be set off by a technique such as a different-colored background or reverse video. In some embodiments, the position of display 1513 relative to the file may be changed from within display 1513, as well as by moving rectangle 504. In such embodiments, rectangle 504 will move in scroll bar 1511 as display 1513 moves in the file.

There are many ways in which line representations 207 may provide detailed information about the lines in the file. For example, line representations 207 may show indentations as previously described and may also show blank lines, either by a different color or by the color of scroll bar 1511, as shown in FIG. 15. Further, if the text editor marks text lines which are parts of special structures such as section headings or lists, those lines may be displayed in different colors, so that the logical structure of the document becomes visible from the line representations in scroll bar 1511. Additionally, if a word search is done on the file being edited, the line representations 207 for the lines containing the searched-for words may be given a different appearance. In some embodiments, they may be given a different color, in others, the line representations may blink, and in still others, they may become dashed.

If there is other information about the file which is linked to the lines of the file, the line representations in the scroll bar can be used to display that information, too. For example, if the text being edited was a program in the body of code with which the preferred embodiment was concerned, the line representations could show all of the information available in the modification request data base. The developer would thus be able to determine as he edited which modification request had added the line he was editing, when it was last modified, and who modified it, to name a few facts.

Finally, rectangle 504 and the line representations 207 can be used to specify the lines affected by operations such as delete and move. A delete operation in an editor using display 1503 can work as follows: the user selects delete from operations menu 1507; at that point, the user selects the lines to be deleted by using mouse 103 to select line representations 207 in scroll bar 1511. The appearance of the selected line representations changes to indicate that they are to be deleted. When the user is satisfied that the right lines have been deleted, he again selects the delete operation. The second selection causes the actual deletion to take place. A move operation would be similar, except that the selected text would be moved to a position specified on the scroll bar. Again, once line representations are made available in the scroll bar, many uses for them become apparent.

Additionally, techniques described with regard to the preferred embodiment's code viewers may be applied in a text editor. For example, there may be more than one window in text display 1513, and each window may correspond to a rectangle 504. Attachment and detachment of the cursor from the rectangles 504 for the windows would be as described for the preferred embodiment. The use of multiple rectangles 504 would permit simultaneous comparison of different parts of the file. For example, if a user was interested in how a word was used in different parts of the file, the user could do a search, which would result in highlighted line representations, as described before, and could then use several rectangles 504 to look at the highlighted line representations and compare how the word was used in the locations.

Conclusion

The foregoing detailed description of a preferred embodiment has disclosed to one of ordinary skill in the art how certain display techniques may be implemented and used to give a user of a computer system both an overview over a great many entities and detailed access to selected ones of the entities. As is apparent from the detailed description, the techniques represent fundamental innovations. Many variations on the techniques and on the manner in which they are implemented are possible. For example, the preferred embodiment uses color to relate modification requests to lines; in other embodiments, color in the widest sense may be used, i.e., a gray scale or different kinds of shadings may be used instead of color. Further, any other change in appearance may be employed to distinguish line representations. Examples might be blinking line representations on and off, changing their shapes, or causing them to change their positions. Further, the columns of the preferred embodiment could be replaced by any arrangement which was useful to show an entity to which the entities represented by the line representations belonged. As regards implementation, mouse 103 could be replaced by any kind of pointing device, including cursor control keys and pen devices. The data structures described herein would of course be varied according to the kind of information being displayed, as would the operation of the code viewer.

For all of these reasons, the implementation disclosed herein is to be regarded in all respects as merely illustrative and exemplary and the invention claimed herein is not defined by the disclosed implementation, but instead by the claims as interpreted according to the doctrine of equivalents.

I claim:

1. Apparatus in a system including a data processor for visibly displaying on a display information about subentities, the subentities contained in a plurality of entities, the information including non-location information and location information about a location of a subentity within a corresponding entity, the display driven by the data processor, the apparatus comprising:

a plurality of entity representation means, each of the entity representation means visibly representing on the display one of the plurality of entities;

a plurality of subentity representation means provided within each of the entity representation means for visibly representing the plurality of subentities, one subentity representation means provided for each of the plurality of subentities, a location of each subentity representation means within the corresponding entity representation means providing the location information, each of the plurality of subentity representation means being individually and simultaneously visible and being separately and individually selectable;

selection means for individually selecting one of the subentity representation means displayed on the display; and information display means, which is associated with the plurality of entity representation means and which is distinct from the entity representation means, for responding to the selection means and for displaying the non-location information about the subentity whose subentity representation means is selected by the selection means.

2. The apparatus set forth in claim 1, wherein:

the selection means comprises at least one subentity representation selector separate from a cursor displayed on the display, each subentity representation selector selecting an individual one of the subentity representation means upon being placed in an immediate neighborhood of that subentity representation means;

the information display means comprises at least one information display means, each information display means corresponding to one of the subentity representation selector, for showing the non-location information on the display about the subentity whose subentity representation means is selected by the corresponding subentity representation selector; and the entity representation means, the subentity representation selectors, and the information display means are all simultaneously present on the display.

3. The apparatus set forth in claim 2, wherein:

one of the plurality of entity representation means represents a text portion;

each of the plurality of subentity representation means corresponding to that entity representation means represents a line in the text portion; and the information display means shows at least the non-location information corresponding to the subentity representation means selected by the subentity representation selector.

4. The apparatus set forth in claim 2, wherein:

the cursor is attached to one of the at least one subentity representation selector; and the attached subentity representation selector moves with the cursor.

5. The apparatus set forth in claim 4, wherein the apparatus includes means for attaching the cursor to one of the at least one subentity representation selector and for detaching the cursor from the subentity representation selector to which the cursor is presently attached.

6. The apparatus set forth in claim 1, wherein:

the plurality of subentity representation means representing the subentities have a range of appearances, the appearances in the range are mapped to values of the non-location information associated with the subentities.

7. The apparatus of claim 6, wherein each subentity representation means representing a subentity has a shade which varies according to the value of the non-location information associated with the subentity.

8. The apparatus set forth in claim 7, wherein:

the display is a color display; and the shade is a shade of color.

9. The apparatus set forth in claim 7, wherein the appearance of each subentity representation means further varies according to whether the subentity representation means is active in the display.

10. The apparatus set forth in claim 6, wherein a shape of each subentity representation means representing a subentity varies according to the value of the non-location information associated with the subentity.

11. The apparatus set forth in claim 10, wherein the shape of each subentity representation means includes a size of the subentity representation means relative to others of the plurality of subentity representation means.

12. The apparatus set forth in claim 1, wherein:

one of the plurality of entity representation means is a bar; and the subentity representation means of that entity representation means are lines in the bar, the location of each line in the bar providing the location information, and a visual characteristic of each line providing the non-location information.

13. The apparatus set forth in claim 1, wherein each of the subentity representation means has a smallest dimension in pixels which is less than 5 pixels.

14. The apparatus set forth in claim 1, wherein each of the plurality of entities is a file stored in a memory of the data processor and each of the subentities is a content portion of one of the files.

15. The apparatus set forth in claim 14, wherein the subentities are content portions of a first file and the non-location information about the subentities is stored in a second file, the second file being distinct from the first file.

16. The apparatus set forth in claim 15, wherein the first file is a text file having at least one line of text and the second file is a database file containing at least one record, each record containing the non-location information, the non-location information concerning changes to one of the lines of text.

17. The apparatus set forth in claim 1, wherein the non-location information is indentation information.

18. Apparatus in a system including a data processor for displaying on a display information about a plurality of subentities, the information including non-location information and location information about a location of each subentity within a entity, each subentity being represented by subentity representation means on the display, the display including a movable cursor, each subentity representation means being separately and individually selectable, the display being driven by the data processor, the apparatus comprising:

at least one subentity representation selector separate from the cursor on the display for selecting one of the subentity representation means representing the subentity which the non-location information is about, each subentity representation selector selecting an individual one of the subentity representation means upon being placed in an immediate neighborhood of the subentity representation means and each subentity representation selector capable of selecting any of the plurality of subentity representation means;

information display means corresponding to each subentity representation selector, the information display means being separate from the at least one subentity representation selector, each information display means for displaying on the display the non-location information concerning the subentity represented by the subentity representation means selected by the corresponding subentity representation selector; and attachment means for attaching a single one of the at least one subentity representation selector to the movable cursor so that the single subentity representation selector moves with the movable cursor;

wherein the selected subentity representation means, the at least one subentity representation selector, and the information display means are all simultaneously present on the display.

19. Information display apparatus in a system including a data processor for making a graphical display of information including location information and non-location information about a plurality of entities of a superentity on a display device driven by the data processor, the information display apparatus comprising:

a plurality of entity representation means for representing the plurality of entities on the display device, each entity representation means corresponding to one of the plurality of entities;

means for interactively linking values of the non-location information about the plurality of entities to corresponding visual characteristics;

value relating means for displaying on the display device, in an area of the display separate from the plurality of entity representation means, the values of the non-location information about the plurality of entities and the corresponding visual characteristics;

at least one superentity representation means separate from the value relating means, the entity representation means which represent entities of a given superentity are contained within the superentity representation means that represents the given superentity, a location of each entity representation means within the given superentity representation means providing the location information of a location of the corresponding entity within the corresponding superentity; and means responsive to the means for interactively specifying for causing each entity representation means having a value of the non-location information about the plurality of entities to be displayed on the display device with the visual characteristic corresponding to that value of the non-location information.

20. The information display apparatus set forth in claim 19, wherein the entity representation means have a smallest dimension in pixels which is less than 5 pixels.

21. The information display apparatus set forth in claim 19, wherein the visual characteristics are shades.

22. The information display apparatus set forth in claim 21, wherein the shades are shades of color.

23. The information display apparatus set forth in claim 19, wherein the value relating means comprises a plurality of locations within the value relating means, each location in the value relating means specifying both a value of the non-location information and a visual characteristic for the entity representation means.

24. The information display apparatus set forth in claim 19, wherein the non-location information is indentation information.

25. An apparatus for visually displaying information concerning a selected file, the apparatus comprising:

a memory in which the file is stored, the selected file comprising a plurality of content portions;

a display; and a data processor connected to the memory and the display and including:

image generating means for generating and displaying on the display a file representation image, the file representation image comprising:

a shaft representing locations within the selected file, and a plurality of information representation subimages, wherein:

each information representation subimage has at least one visual characteristic representing non-location information about a corresponding one of the plurality of content portions of the selected file, and each information representation subimage is positioned at a location within the shaft to provide location information about a location of the corresponding content portion within the selected file, selection means for selecting one of the plurality of information representation subimages of the file representation image, and information display means for displaying on the display, independently of the file representation means, the non-location information about the content portion corresponding to the selected information representation subimage.

26. The apparatus set forth in claim 25, wherein a length of the shaft is determined based on a length of the selected file.

27. The apparatus set forth in claim 25, wherein each information representation subimage has a smallest dimension in pixels which is less than 5 pixels.

28. The apparatus set forth in claim 25, wherein:
each visual characteristic has a range of values; and
each value of each visual characteristic corresponds to a value of the non-location information associated with the content portions of the file.

29. The apparatus set forth in claim 25, wherein the at least one visual characteristic includes a shade, the shade varying based on a value of the non-location information associated with the content portions of the file.

30. The apparatus set forth in claim 29, wherein:
the display is a color display; and
the shade is a shade of color.

31. The apparatus set forth in claim 25, wherein the at least one visual characteristic includes a shape of the information representation subimages, the shape varying based on a value of the non-location information associated with the content portions of the file.

32. The apparatus set forth in claim 31, wherein the shape of each information representation subimage includes a size of the information representation subimage relative to others of the plurality of information representation subimages.

33. The apparatus set forth in claim 25, wherein the visual characteristic of each information representation subimage further varies according to whether the information representation subimage is active in the display.

34. The apparatus set forth in claim 25, wherein:
the shaft is a bar having a length and a width; and
the information representation subimages of that file representation image are lines extending at least partially across the width of the bar and arranged along the length of the bar.

35. The apparatus set forth in claim 25, wherein the non-location information about the content portions of the file is stored in a second file, the second file being distinct from the file.

36. The apparatus set forth in claim 25, wherein the file is a text file having a plurality of lines of text, each content portion includes at least one line of text, and the second file is a database file containing at least one record, each record containing the non-location information, the non-location information concerning changes to one of the content portions.

37. The apparatus set forth in claim 25, wherein the non-location information is indentation information.

38. An apparatus for visually displaying a file representation image of a selected file, the apparatus comprising:
a memory in which the file is stored, the selected file comprising a plurality of content elements;
a display; and
a data processor connected to the memory and the display and including:
image generating means for generating and outputting to the display the file representation image, the file representation image comprising:
a shaft representing locations within the selected file, a length of the shaft determined based on a length of the selected file, and
a plurality of file representation subimages, wherein:
each file representation subimage has at least one visual characteristic representing non-location information about one of the plurality of content elements of the selected file, and
each file representation subimage is positioned at a location within the shaft to provide location information about a location of the one of the plurality of content elements within the selected file,
selection means for selecting one of the plurality of file representation subimages of the file representation image, and
information display means for displaying on the display, independently of the file representation means, the non-location information about the content element that corresponds to the selected file representation subimage.

39. The apparatus set forth in claim 38, wherein a length of the shaft is determined based on a length of the selected file.

40. The apparatus set forth in claim 38, wherein each file representation subimage has a smallest dimension in pixels which is less than 5 pixels.

41. The apparatus set forth in claim 38, wherein:
each visual characteristic has a range of values; and
each value of each visual characteristic corresponds to a value of the non-location information associated with the content elements of the file.

42. The apparatus set forth in claim 38, wherein the at least one visual characteristic includes a shade, the shade varying based on a value of the non-location information associated with the content elements of the file.

43. The apparatus set forth in claim 38, wherein:
the display is a color display; and
the shade is a shade of color.

44. The apparatus set forth in claim 38, wherein the at least one visual characteristic includes a shape of the file representation subimages, the shape varying based on a value of the non-location information associated with the content portions of the file.

45. The apparatus set forth in claim 44, wherein the shape of each file representation subimage includes a size of the file representation subimage relative to others of the plurality of file representation subimages.

46. The apparatus set forth in claim 38, wherein the visual characteristic of each file representation subimage further varies according to whether the information representation subimage is active in the display.

47. The apparatus set forth in claim 38, wherein:
the shaft has a length and a width; and
the file representation subimages of the file representation image are lines extending at least partially across the width of the shaft and arranged along the length of the shaft.

48. The apparatus set forth in claim 38, wherein the non-location information about the content elements of the file is stored in a second file, the second file being distinct from the file.

49. The apparatus set forth in claim 38, wherein the file is a text file having a plurality of lines of text, each content element includes at least one line of text, and the second file is a database file containing at least one record, each record containing the non-location information, the non-location information concerning changes to one of the content elements.

50. The apparatus set forth in claim 38, wherein the non-location information is indentation information.

* * * * *